United States Patent
Packouz et al.

(10) Patent No.: US 11,710,471 B2
(45) Date of Patent: *Jul. 25, 2023

(54) APPARATUS, SYSTEM, AND METHOD FOR RECORDING AND RENDERING MULTIMEDIA

(71) Applicant: Intelliterran, Inc., Miami, FL (US)

(72) Inventors: David Packouz, Miami, FL (US); Elimelech Packouz, Miami, FL (US); Jeremy Korn, Miami, FL (US)

(73) Assignee: Intelliterran, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/239,807

(22) Filed: Apr. 26, 2021

(65) Prior Publication Data

US 2021/0241736 A1  Aug. 5, 2021

Related U.S. Application Data

(63) Continuation of application No. 16/116,845, filed on Aug. 29, 2018, now Pat. No. 10,991,350.

(Continued)

(51) Int. Cl.
*G06F 3/16* (2006.01)
*G10H 1/00* (2006.01)
(Continued)

(52) U.S. Cl.
CPC ....... *G10H 1/0025* (2013.01); *G06F 3/04886* (2013.01); *G06F 3/165* (2013.01);
(Continued)

(58) Field of Classification Search
CPC .. G10H 1/0025; G10H 1/0008; G10H 1/0033; G10H 1/42; G10H 2220/005;
(Continued)

(56) References Cited

U.S. PATENT DOCUMENTS

| 3,649,736 A | 3/1972 | Van Der Kooij |
| 3,691,894 A | 9/1972 | Schneider et al. |

(Continued)

FOREIGN PATENT DOCUMENTS

| CA | 3039257 | 4/2018 |
| CN | 109891496 A | 6/2019 |

(Continued)

OTHER PUBLICATIONS

Japanese Notification of Reasons for Refusal dated Apr. 26, 2022 cited in Application No. 2020-053794, 5 pgs.

(Continued)

*Primary Examiner* — Joseph Saunders, Jr.
(74) *Attorney, Agent, or Firm* — Bekiares Eliezer LLP

(57) ABSTRACT

An apparatus may be designed to enable a user to receive, record, display, edit, arrange, re-arrange, play, loop, extend, export and import audio and video data. The audio and video data to be organized as, for example, but not limited to, a song comprised of song parts. The song parts may be comprised of tracks, and each track may be comprised of one or more layers. The various methods and systems disclosed herein incorporate such data segmentation to enable the user to intuitively and hands-free record, arrange, and perform songs comprised of both sequential and parallel tracks. In this way, the looper may enable a musician to record and loop tracks for a song, arrange the tracks into song parts, and during the same session, transition the playback from one song part to another, all the while recording a track on top of the transitioning song parts.

20 Claims, 19 Drawing Sheets

Related U.S. Application Data

(60) Provisional application No. 62/551,605, filed on Aug. 29, 2017.

(51) Int. Cl.
*G06F 3/04886* (2022.01)
*G06F 16/40* (2019.01)
*G10H 1/42* (2006.01)

(52) U.S. Cl.
CPC ............ *G06F 16/40* (2019.01); *G10H 1/0008* (2013.01); *G10H 1/0033* (2013.01); *G10H 1/42* (2013.01); *G06F 2203/04803* (2013.01); *G10H 2220/005* (2013.01); *G10H 2250/641* (2013.01)

(58) Field of Classification Search
CPC ............. G10H 2250/641; G10H 1/348; G10H 1/0066; G10H 2210/346; G10H 2210/371; G10H 2220/106; G10H 2240/211; G10H 2240/285; G06F 16/40; G06F 3/04886; G06F 3/165; G06F 2203/04803
See application file for complete search history.

(56) References Cited

U.S. PATENT DOCUMENTS

| | | |
|---|---|---|
| 3,898,397 A | 8/1975 | Devore et al. |
| 4,168,647 A | 9/1979 | Petillo |
| 4,339,980 A | 7/1982 | Hooke et al. |
| D279,905 S | 7/1985 | Whited |
| 4,899,636 A | 2/1990 | Chiba et al. |
| 5,092,216 A | 3/1992 | Wadhams |
| 5,105,711 A | 4/1992 | Barnard |
| 5,117,285 A | 5/1992 | Nelson et al. |
| 5,166,467 A | 11/1992 | Brown |
| 5,192,823 A | 3/1993 | Suzuki et al. |
| 5,223,655 A | 6/1993 | Watanabe et al. |
| 5,296,641 A | 3/1994 | Stelzel |
| 5,308,916 A | 5/1994 | Murata et al. |
| 5,421,236 A | 6/1995 | Sanger |
| 5,502,275 A | 3/1996 | Kondo et al. |
| 5,637,820 A | 6/1997 | Wittman |
| 5,675,376 A | 10/1997 | Andersson et al. |
| 5,786,540 A | 7/1998 | Westlund |
| 5,837,912 A | 11/1998 | Eagen |
| 5,845,240 A | 12/1998 | Fielder |
| 5,866,829 A | 2/1999 | Pecoraro |
| 5,877,444 A | 3/1999 | Hine et al. |
| 5,915,288 A | 11/1999 | Gabriel |
| 5,986,200 A | 11/1999 | Curtin |
| 6,084,170 A | 7/2000 | Laroche |
| 6,121,532 A | 9/2000 | Kay |
| 6,166,314 A | 12/2000 | Weinstock et al. |
| 6,215,055 B1 | 4/2001 | Saravis |
| 6,257,535 B1 | 7/2001 | Jaing |
| 6,574,685 B1 | 6/2003 | Schwartz et al. |
| 6,924,425 B2 | 8/2005 | Naples et al. |
| 6,960,715 B2 | 11/2005 | Riopelle |
| 7,015,390 B1 | 3/2006 | Rogers |
| 7,074,998 B2 | 7/2006 | Hurwicz |
| 7,220,913 B2 | 5/2007 | Juszkiewicz et al. |
| 7,247,789 B2 | 7/2007 | Fishman et al. |
| 7,262,359 B1 | 8/2007 | Edwards, Sr. et al. |
| 7,294,777 B2 | 11/2007 | Hofmeister et al. |
| 7,355,110 B2 | 4/2008 | Nash |
| 7,373,210 B2 | 5/2008 | Pennock et al. |
| 7,427,705 B2 | 9/2008 | Rubens |
| 7,504,577 B2 | 3/2009 | Riopelle |
| 7,541,536 B2 | 6/2009 | Daniel |
| 7,592,533 B1 | 9/2009 | Lee |
| 7,608,776 B2 | 10/2009 | Ludwig |
| 7,636,658 B2 | 12/2009 | Campbell et al. |
| 7,671,268 B2 | 3/2010 | Nicoll |
| 7,678,985 B2 | 3/2010 | Adams et al. |
| 7,754,956 B2 | 7/2010 | Gain et al. |
| 7,844,069 B2 | 11/2010 | Banks |
| 7,923,623 B1 | 4/2011 | Beaty |
| 8,035,025 B1 | 10/2011 | Donnell |
| 8,093,486 B2 | 1/2012 | Behringer et al. |
| 8,106,283 B2 | 1/2012 | Nishitani et al. |
| 8,180,063 B2 | 5/2012 | Henderson |
| 8,217,253 B1 | 7/2012 | Beaty |
| 8,253,776 B2 | 8/2012 | Chen et al. |
| 8,324,494 B1 | 12/2012 | Packouz |
| 8,338,689 B1 | 12/2012 | Beaty |
| D680,502 S | 4/2013 | McMillen |
| 8,431,811 B2 | 4/2013 | Riopelle |
| 8,455,749 B1 | 6/2013 | Gage et al. |
| 8,785,760 B2 | 7/2014 | Serletic et al. |
| 8,816,180 B2 | 8/2014 | Georges et al. |
| 8,818,173 B2 | 8/2014 | Wallace |
| 8,835,739 B2 | 9/2014 | Bencar et al. |
| 8,835,740 B2 | 9/2014 | Riopelle |
| 8,847,057 B2 | 9/2014 | Koah |
| 8,865,992 B2 | 10/2014 | Shavit |
| 8,872,014 B2 | 10/2014 | Sandler et al. |
| 8,907,191 B2 | 12/2014 | Seese, Jr. et al. |
| 8,908,008 B2 | 12/2014 | Tan et al. |
| 9,012,756 B1 | 4/2015 | Goldman et al. |
| 9,047,850 B1 | 6/2015 | Beaty |
| 9,088,693 B2 | 7/2015 | Pham et al. |
| 9,176,610 B1 | 11/2015 | Kruge et al. |
| 9,274,745 B2 | 3/2016 | Clements et al. |
| 9,286,872 B2 | 3/2016 | Packouz et al. |
| 9,443,501 B1 | 9/2016 | Adam |
| 9,495,947 B2 | 11/2016 | Packouz |
| 9,691,429 B2 | 6/2017 | Leiberman et al. |
| 9,721,551 B2 | 8/2017 | Silverstein |
| 9,843,404 B2 | 12/2017 | Kiely et al. |
| 9,852,216 B2 | 12/2017 | Belcher et al. |
| 9,892,720 B2 | 2/2018 | Packouz |
| 9,905,210 B2 | 2/2018 | Packouz |
| 9,953,624 B2 | 4/2018 | Baker et al. |
| 10,421,013 B2 | 9/2019 | Challinor et al. |
| 10,546,568 B2 | 1/2020 | Packouz |
| 10,741,154 B2 | 8/2020 | Packouz |
| 10,741,155 B2 | 8/2020 | Packouz |
| 10,991,350 B2 | 4/2021 | Packouz |
| 2001/0015123 A1 | 8/2001 | Nishitani et al. |
| 2001/0035087 A1 | 11/2001 | Subotnick |
| 2002/0035616 A1 | 3/2002 | Diamond et al. |
| 2002/0111703 A1 | 8/2002 | Cole |
| 2003/0110929 A1 | 6/2003 | Riopelle |
| 2003/0171933 A1 | 9/2003 | Perille |
| 2003/0196542 A1 | 10/2003 | Harrison, Jr. |
| 2004/0136549 A1 | 7/2004 | Pennock et al. |
| 2004/0144241 A1 | 7/2004 | Juskiewicz et al. |
| 2004/0159214 A1 | 8/2004 | Tsuge et al. |
| 2004/0159222 A1 | 8/2004 | Pennock et al. |
| 2005/0241466 A1 | 11/2005 | Riopelle |
| 2006/0000347 A1 | 1/2006 | Preece |
| 2006/0159291 A1 | 7/2006 | Fliegler et al. |
| 2006/0266200 A1 | 11/2006 | Goodwin |
| 2007/0000375 A1 | 1/2007 | Harrison, Jr. |
| 2007/0068371 A1 | 3/2007 | Weir |
| 2007/0136769 A1 | 6/2007 | Goldberg et al. |
| 2007/0234880 A1 | 10/2007 | Adams et al. |
| 2007/0234888 A1 | 10/2007 | Rotolo de Moraes |
| 2008/0028920 A1 | 2/2008 | Sullivan |
| 2008/0053293 A1 | 3/2008 | Georges et al. |
| 2008/0156180 A1 | 7/2008 | Bagale |
| 2008/0167740 A1 | 7/2008 | Merrill |
| 2008/0212439 A1 | 9/2008 | Chan et al. |
| 2008/0229914 A1 | 9/2008 | Nathanial |
| 2009/0221369 A1 | 9/2009 | Riopelle |
| 2010/0037755 A1 | 2/2010 | McMillen et al. |
| 2010/0087937 A1 | 4/2010 | Tolson |
| 2010/0180755 A1 | 7/2010 | Copeland et al. |
| 2010/0305732 A1 | 12/2010 | Serletic |
| 2010/0307325 A1 | 12/2010 | Appel |
| 2011/0023691 A1 | 2/2011 | Iwase et al. |

(56) References Cited

U.S. PATENT DOCUMENTS

| | | |
|---|---|---|
| 2011/0088536 A1 | 4/2011 | McMillen et al. |
| 2011/0095874 A1 | 4/2011 | Bennett |
| 2011/0112672 A1 | 5/2011 | Brown et al. |
| 2011/0143837 A1 | 6/2011 | Riopelle |
| 2011/0153047 A1 | 6/2011 | Cameron et al. |
| 2011/0271820 A1 | 11/2011 | Cockerell et al. |
| 2011/0299238 A1 | 12/2011 | Radin et al. |
| 2012/0014673 A1 | 1/2012 | O'Dwyer |
| 2012/0097014 A1 | 4/2012 | Matsumoto |
| 2012/0144981 A1 | 6/2012 | Ciccone |
| 2012/0160079 A1 | 6/2012 | Little et al. |
| 2012/0263432 A1 | 10/2012 | Shore |
| 2012/0266741 A1 | 10/2012 | Bencar et al. |
| 2012/0297962 A1 | 11/2012 | O'Donnell et al. |
| 2013/0030559 A1 | 1/2013 | Estes |
| 2013/0053993 A1 | 2/2013 | Setoguchi |
| 2013/0058507 A1 | 3/2013 | Arknæs-Pedersen et al. |
| 2013/0118340 A1 | 5/2013 | D'Amours |
| 2013/0138233 A1 | 5/2013 | Sander et al. |
| 2013/0154920 A1 | 6/2013 | Radin et al. |
| 2013/0182856 A1 | 7/2013 | Setoguchi |
| 2013/0201398 A1 | 8/2013 | Radin et al. |
| 2013/0291708 A1 | 11/2013 | Orshan |
| 2013/0292524 A1 | 11/2013 | Canivell Grifols et al. |
| 2013/0297844 A1 | 11/2013 | Rosenberg et al. |
| 2013/0298752 A1 | 11/2013 | Juszkiewicz |
| 2013/0312588 A1 | 11/2013 | Orshan |
| 2014/0052282 A1 | 2/2014 | Balassanian |
| 2014/0123838 A1 | 5/2014 | D'Amours |
| 2014/0202316 A1 | 7/2014 | Szalay et al. |
| 2014/0202320 A1 | 7/2014 | White et al. |
| 2014/0238221 A1 | 8/2014 | Roberts et al. |
| 2014/0266766 A1 | 9/2014 | Dobbe |
| 2014/0331850 A1 | 11/2014 | Cho |
| 2015/0013526 A1 | 1/2015 | Packouz et al. |
| 2015/0046824 A1 | 2/2015 | Humphrey et al. |
| 2015/0066780 A1 | 3/2015 | Cohen et al. |
| 2015/0094833 A1 | 4/2015 | Clements et al. |
| 2015/0154948 A1 | 6/2015 | Urry et al. |
| 2015/0161973 A1 | 6/2015 | Packouz |
| 2015/0161978 A1 | 6/2015 | Packouz |
| 2016/0103844 A1 | 4/2016 | Belcher et al. |
| 2016/0267805 A1 | 9/2016 | Dekett et al. |
| 2016/0335996 A1 | 11/2016 | Wardlow |
| 2017/0025107 A1 | 1/2017 | Packouz |
| 2017/0025108 A1 | 1/2017 | Packouz |
| 2017/0041357 A1 | 2/2017 | Wang et al. |
| 2017/0041359 A1 | 2/2017 | Kwan |
| 2017/0062006 A1 | 3/2017 | Plom et al. |
| 2017/0092251 A1 | 3/2017 | Mizrahi |
| 2018/0009631 A1 | 1/2018 | Krishnamurthy et al. |
| 2018/0130452 A1 | 5/2018 | Packouz |
| 2018/0261197 A1 | 9/2018 | Ceccolini |
| 2019/0051273 A1 | 2/2019 | Fryette et al. |
| 2019/0058423 A1 | 2/2019 | Knoedgen et al. |
| 2019/0066643 A1 | 2/2019 | Packouz et al. |
| 2019/0229666 A1 | 7/2019 | Zhou et al. |
| 2020/0043453 A1 | 2/2020 | Lang et al. |

FOREIGN PATENT DOCUMENTS

| | | |
|---|---|---|
| DE | 102007034806 A1 | 2/2009 |
| EP | 1974099 A2 | 9/2008 |
| EP | 2638829 A1 | 9/2013 |
| EP | 2495940 | 9/2014 |
| EP | 2950303 A1 | 12/2015 |
| ES | 2412605 | 7/2013 |
| ES | 2510966 | 10/2014 |
| JP | 7219545 A | 8/1995 |
| JP | 2006513448 A | 4/2006 |
| JP | 201350530 A | 3/2013 |
| JP | 2013171070 A | 9/2013 |
| WO | 2012062939 A1 | 5/2012 |
| WO | 2014114833 A1 | 7/2014 |
| WO | 2015118195 A1 | 8/2015 |
| WO | 2015193526 A1 | 12/2015 |
| WO | 2017100850 A1 | 6/2017 |
| WO | 2018067124 | 4/2018 |
| WO | 2019046487 A1 | 3/2019 |

OTHER PUBLICATIONS

International Search Report and Written Opinion dated Nov. 7, 2018 cited in Application No. PCT/US18/48637, 13 pgs.
International Preliminary Report on Patentability dated Oct. 31, 2019 cited in Application No. PCT/US2018/048637, 10 pgs.
Extended European Search Report dated Apr. 23, 2021 cited in Application No. 18851204.0, 17 pgs.

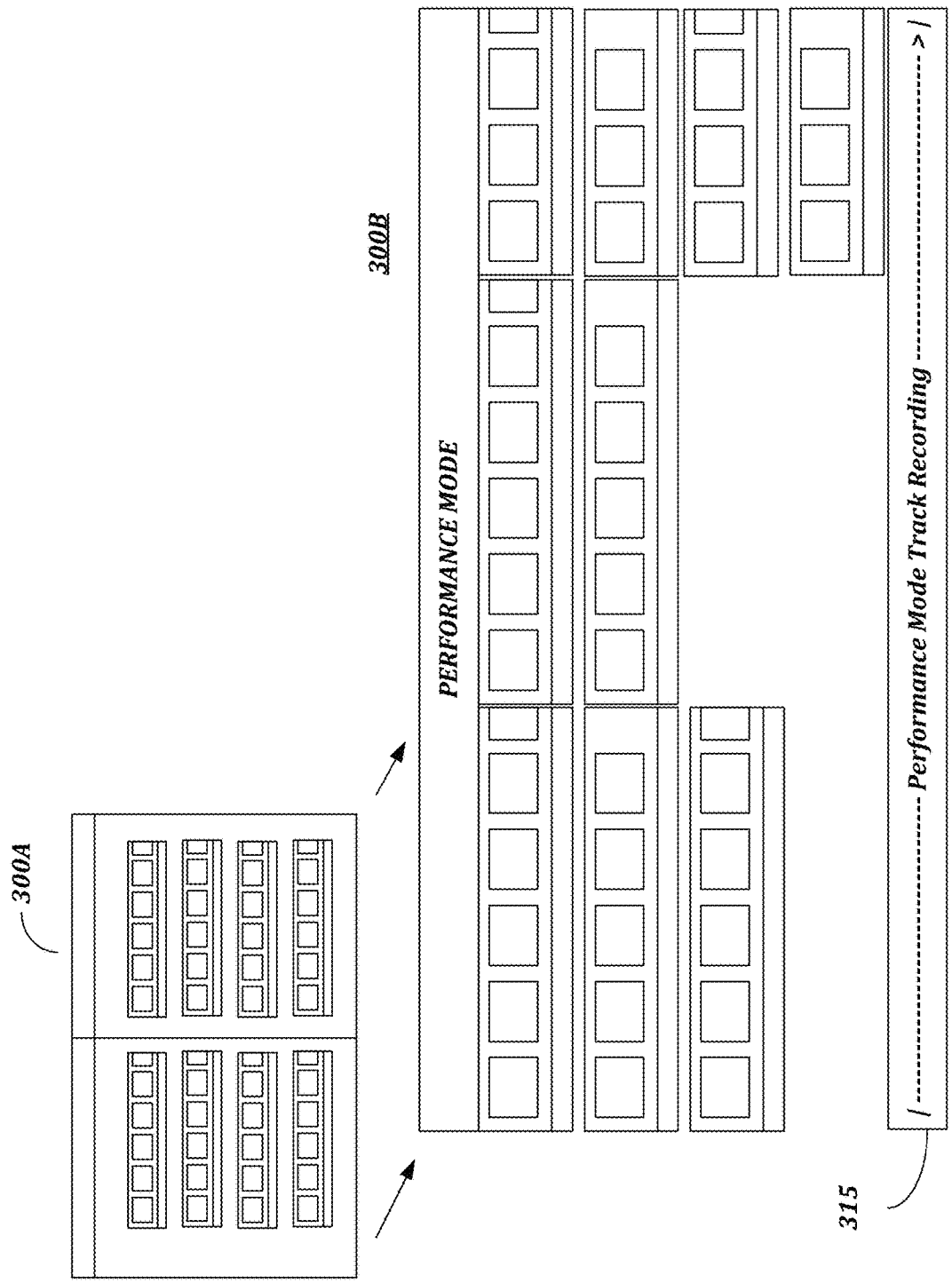

*Measurements depicted for Illustrative Purposes Only*

Measurements depicted for Illustrative Purposes Only

APPARATUS, SYSTEM, AND METHOD FOR RECORDING AND RENDERING MULTIMEDIA

RELATED APPLICATIONS

This application is a continuation of U.S. application Ser. No. 16/116,845 filed on Aug. 29, 2018, which issues on Apr. 27, 2021 as U.S. Pat. No. 10,991,350, which claims the benefit of U.S. Provisional Application No. 62/551,605, filed on Aug. 29, 2017, which are incorporated herein by reference.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to music composition, arrangement, and performance.

BACKGROUND

Looper pedals are currently used by musicians to record a phrase of a song and replay the recording as a loop such that the loop can be used as a backing track. Many times, musicians overdub on the loops as well as create more than one loop for use as song parts (verse, chorus, bridge, break, etc.). Recording this much information requires that the musician remember the order and placement of the content that is recorded in each loop and/or song part.

Moreover, current looper designs limit the number of parallel and sequential loops to the number of control footswitches, as each loop is assigned to a specific footswitch. Further still, current looper designs do not allow groups of parallel loops to be used sequentially. Users of conventional loopers are forced to choose between using parallel or sequential loops, but cannot do both at the same time.

Current loopers either only allow users to overdub to the current length of the original recorded track, or must set in advance what length multiple of the original track the overdub will be. This limits the musician's spontaneous creativity when recording an overdub.

Though loopers are effective composition tools, it is cumbersome to share content recorded on the looper with other musicians or to receive recorded content from other musicians to use in the looper for collaboration purposes. This must currently be done by downloading files to another intermediary device before they can be loaded onto the looper for use in collaboration.

BRIEF OVERVIEW

This brief overview is provided to introduce a selection of concepts in a simplified form that are further described below. This brief overview is not intended to identify key features or essential features of the claimed subject matter. Nor is this brief overview intended to be used to limit the claimed subject matter's scope.

Embodiments of the present disclosure may provide an apparatus, system, and method for recording and rendering multimedia. The apparatus, which may be referred to herein as a "looper" may be configured to perform the methods disclosed herein, independently or in conjunction with the systems disclosed herein. The looper, in a general sense, may be configured to capture a signal and play the signal in a loop as a background accompaniment such that a user of the apparatus (e.g., a musician) can perform over the top of the background loop. The captured signal may be received from, for example, an instrument such as a guitar or any apparatus producing an analog or digital signal.

The looper may provide an intuitive user interface designed to be foot-operable. In this way, a musician can operate the looper hands-free. For example, the looper may comprise a plurality of foot-operable controls, displays, inputs, and outputs in a portable form factor. The function and design of the looper's hardware and software components provide an advantage over conventional loopers and digital audio workstations, as the looper of the present disclosure enables the curation of both audio and video content to optimize interaction with the musician. For example, in some embodiments, the looper may enable a musician to record a song and corresponding music video with nothing more than an instrument, a mobile phone, and the looper pedal, and publish the content when rendered.

As such, looper 105 may be designed to enable a user to receive, record, display, edit, arrange, re-arrange, play, loop, extend, export and import audio and video data. Such operations may be performed during a "session", and each operation may be referred to as a "session activity." In the various embodiments described herein, this functionality may be achieved, at least in part, by systems and methods that enable the data to be organized as, for example, but not limited to, a song comprised of song parts. The song parts may be comprised of tracks, and each track may be comprised of one or more layers. The various methods and systems disclosed herein incorporate such data segmentation to enable the user to intuitively and hands-free record, arrange, and perform songs comprised of both sequential and parallel tracks. In this way, the looper may enable a musician to record and loop tracks for a song, arrange the tracks into song parts, and during the same session, transition the playback from one song part to another, all the while recording a track (e.g., vocals or a guitar solo) on top of the transitioning song parts.

In yet further embodiments, a recorded track may comprise one or more layers. The looper may provide a plurality of layer composition methods, including, for example, a layer overdub method, a layer replacement method, and a new layer method. In brief, the layer overdub method may be operative to overlay and/or extend the duration of the first track layer, thereby dictating the duration of all subsequent layers; the layer replace method may be operative to overwrite a current layer; and the new layer method may add a new layer to the track for parallel playback. As will be detailed below, the musician may be enabled to perform these operations, as well as others, such as, but not limited to, re-recording, muting or unmuting a track an all of its layers or just a single layer within the track, all during a hands-free session. One advantage of overdubbing a track, rather than recording a new track is, in accordance to the embodiments herein, you can 'stack' multiple layers on top of the original layer without having to press rec/stop rec for each layer. In this way, looper 105 may be configured to keep recording new layers as it cycles around the original layer duration.

Still consistent with embodiments of the disclosure, the looper may be further operable by and with a computing device. The computing device may comprise, for example, but not limited to, a smartphone, a tablet, a midi-device, a digital instrument, a camera, or other computing means. In some embodiments, the looper may comprise the computing device, or portions thereof. The systems disclosed herein may provide for a computer-readable medium as well as computer instructions contained within a software operatively associated with the computing device. Said software may be configured to operate the computing device for bi-directional communication with the looper and other external devices.

In some embodiments, the aforementioned software may be provided in the form of mobile, desktop, and/or web application operatively associated with the looper. The application, or distributed portions thereof, may be installed on the looper so as to enable a protocol of communication with the external devices. In this way, the application may be configured to operate both the looper and an external device, such as, for example, but not limited to, a hardware sensor (e.g., a camera). In one example instance, the camera may be operated by the application to record a video during a session (e.g., capturing a video or a video of the musician recording a track with the looper). The operation of the looper during the session may cause the application to trigger actions on the external devices. In this way, session activity may be synchronized such that a recording of a track corresponds to, for example, a recording of the video. Each segment of the recorded video, in turn, may be synced with session activity (e.g., a recording or playback of track or song part).

Still consistent with embodiments herein, the application may be further configured to create separate video scenes for each song part. The scenes may be organized and displayed as on-screen overlays as detailed herein. In some embodiments, the application may be configured to capture and render the video such that the on-screen video overlays will change as the user changes song parts. In this way, the application may be configured to cause a playback of recorded video segments associated with each track or song part, in a repeated looped fashion such that it is synced with the associated audio of the loop, track or song part. The rendered composition may then, in turn, be embodied as a multimedia file comprised of an overlay and stitching of audio and video tracks corresponding to, for example, a recorded performance using the looper.

In yet further embodiments of the present disclosure, the application may further be configured to enable collaborative control of other connected devices. As on example, a plurality of loopers may be synchronized in, for example, playback and transition of songs and song parts. As another example, a peripheral device (e.g., a drum machine, a drum looper, or other midi-enabled device), may synchronize with one or more loopers in order to trigger commands on the looper(s). Networked collaboration and interaction, and the various applications associated therewith, are disclosed in greater detail below.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIGS. 3A-3C illustrate an embodiment of a song structure and rendering for recording and rendering multimedia;

DETAILED DESCRIPTION

Figure 1:
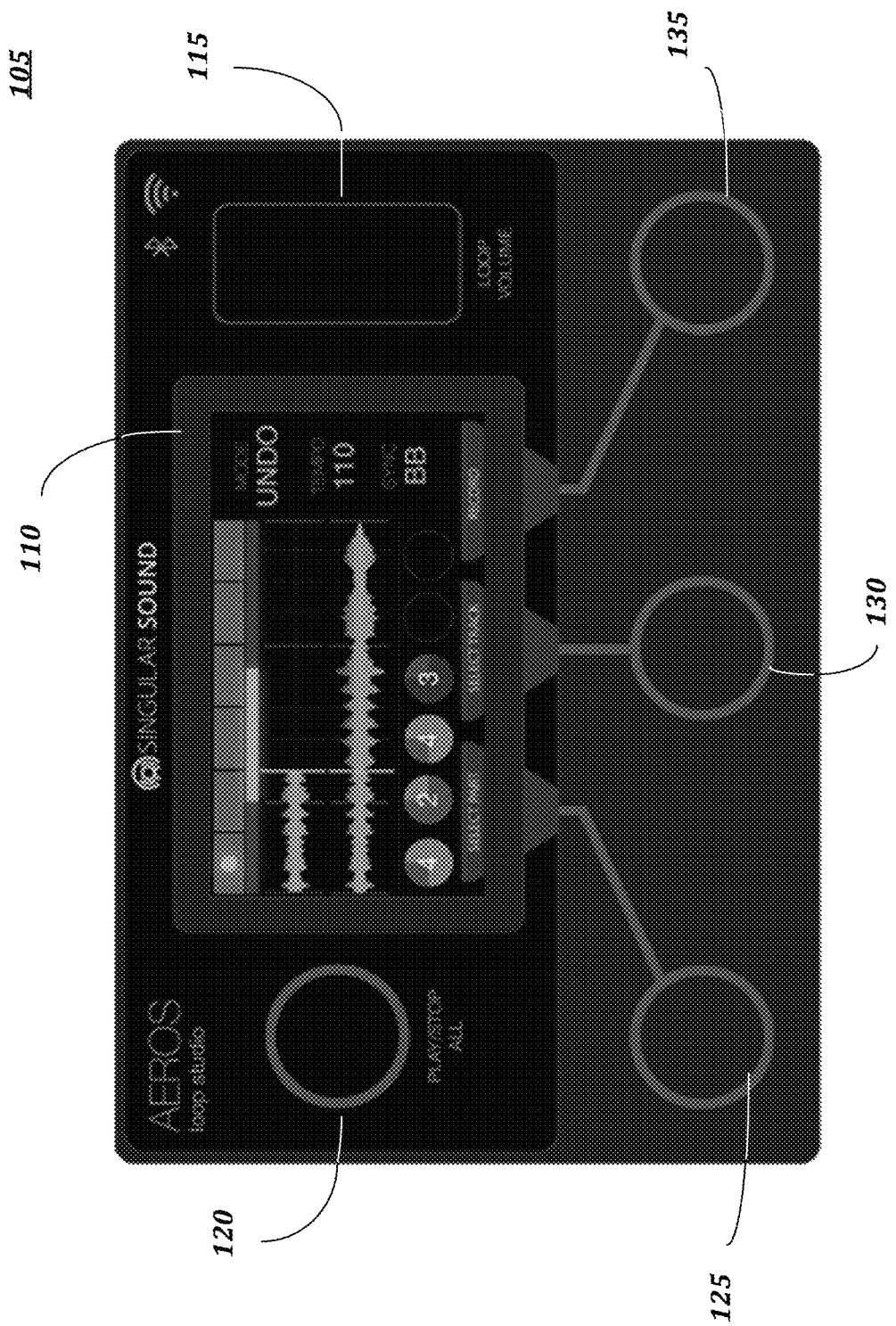
FIG. 1 illustrates an embodiment of an apparatus for recording and rendering multimedia.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of audio waveforms, embodiments of the present disclosure are not limited to use only in this context. For example, MIDI interface and MIDI mapping may be employed in the various embodiments disclosed herein.

I. Platform Overview

This brief overview is provided to introduce a selection of concepts in a simplified form that are further described below. This brief overview is not intended to identify key features or essential features of the claimed subject matter. Nor is this brief overview intended to be used to limit the claimed subject matter's scope.

Embodiments of the present disclosure provide methods, apparatus, and systems for loop generation and collaboration (collectively referred to herein as a "platform" for loop generation and collaboration). The platform may be enabled to, but not limited to, for example, receive, record, display, edit, arrange, re-arrange, play, loop, extend, export and import audio data. Consistent with the various embodiments disclosed herein, the platform may comprise a user interface that enables a hands-free composition, management, navigation and performance of, for example, but not limited to, an audio production associated with the audio data (referred to herein as a "song"). As will be disclosed with greater detail below, these components may then be shared with other platform users and used interchangeably between song compositions, productions, and performances.

Embodiments of the present disclosure may provide a self-enclosed, foot-operated apparatus that enables, by way of non-limiting example, where a user interactively generate loops in both parallel and sequence, arrange the loops into song parts (groups of parallel loops), arrange song parts into songs, navigate between song parts, and extend the length of a loop with a longer overdub. The apparatus may further include a display that provides meaningful visual representations to the user with regard to the aforementioned functions.

Embodiments of the present disclosure may provide a "performance" mode of operation. It should be noted that the term "performance" is only a label and is not to limit the characterization of the functionality disclosed in association therewith. Performance mode may enable a user of the apparatus to record and render a continuous multimedia file encompassing all song parts, where the user can continue the playback of recorded song parts/tracks while performing, for example, another track layer (e.g., 'guitar solo') that is to overlay the background tracks. In this way, unlike conventional loopers, looper 105 may record a guitar solo over the looped background tracks. Furthermore, during performance mode, the user can engage in ordinary session activity (e.g., transition from one song part to the next, turn on/off different tracks or layers, and operate other functions of the looper), all the while recording, for example, the guitar solo during the performance session. The session activity and the recorded guitar solo may be then rendered as a track. Once complete, a rendering of the song with the song parts and the guitar solo may be published to local media, cloud-based media or social networks in accordance to embodiments described herein.

The apparatus may further enable, by way of non-limiting example, the user to share loops, song parts, and songs generated through the platform. The recipients may make modifications, integrate, and build on top of the loops and share them back with the users. In some embodiments, the apparatus may be networked with other similar devices over LAN, WAN, or other connections. In this way, the platform may enable collaboration between the connected users and devices associated with the platform, including the operation and control of those devices over a network connection. The platform may also enable a user to manage the composition and audio files on the device as well as on content that resides on remote servers.

Embodiments of the present disclosure may enable a recording and playback of a video signal and video data associated with each track. For example, just as the platform can receive, capture, arrange, playback, loop, and overdub an audio track, the platform may be configured to receive, capture, arrange, playback, loop, and overdub a video track. The video track may be obtained by, for example, a connection to a recording device. The recording device may be, for example, but not limited to, a computing device (e.g., a smartphone, a tablet, or computer) or a remotely operated camera. The computing device may comprise an application operative to communicate with the looping apparatus.

The application may be configured to operate the computing device so as to capture a video track that is to be associated with an audio track. In this way, an end-user may both record an audio feed and a video feed associated with the audio feed, either simultaneously or sequentially, consistent with the operation of the foot-operated apparatus Still consistent with embodiments of the disclosure, just as the audio track may looped by the platform, so too may the video track be looped along with the corresponding track that the audio is associated with. Further still, just as a song part may comprise multiple audio-tracks looped and played back in parallel, a song part may comprise multiple video-tracks associated with the audio tracks contained therein, looped and played back in parallel. In some embodiments, a song part may be associated with corresponding video track or tracks, but not equivalent to the same quantity of audio tracks. That is, not every audio track needs to be associated with a video track.

Accordingly, embodiments of the present disclosure may comprise a digital signal processing module configured to receive, process, and output images and video signals. In some embodiments, the platform may further comprise a video capture module integrated with, or in operative communication with, the apparatus. It is anticipated that all of the disclosed functionality with regard to audio tracks may be conceivably compatible with the video tracks, with modifications made where necessary by one of ordinary skill in the field of the present disclosure.

As one example, a user of the apparatus can install a smartphone app that syncs with the functionality with the apparatus and captures a video of the user performing the song. Then, each time the particular song part or tracking within a song part is played back, the corresponding video associated with the song part or track is also played. In this way, when a song part is comprised of, for example, six song tracks, all six videos associated with each track is played back synchronously with the audio. In turn, when one track within a song part is turned off, the video associated with the track is also turned off. Furthermore, when the user transitions from one song part to the next song part, the video for the new tracks is played back. In some embodiments, the video files may be stored along with the song, and tied to the song such that the playback of any song part causes a playback of the corresponding video file(s) associated with the song. In such embodiments, the video output may be outputted from the apparatus or by a separate device in communication with the apparatus. It should also be noted that the 'live' playing is also recorded and played back on video (e.g., the guitar solo that isn't recorded into a loop, but still recorded as video and audio data in the rendering).

Still consistent with the embodiments disclosed herein, the song may be rendered as both a multimedia file comprised of audio tracks and video tracks. The composition of the multimedia file may be dependent on, in some embodiments, the arrangement the user has performed and recorded the song. As detailed below, the video output may be presented on each frame of the media file in various ways.

A. Embodiments of the Present Disclosure Provide a Hardware Apparatus Comprising a Set of Computing Elements, Including, but not Limited to, the Following FIG. 1 illustrates an apparatus consistent with the present disclosure may be a standalone looper apparatus 105 (referred to herein as "looper 105"). Looper 105 may comprise an enclosed housing having foot-operated inputs. Still consistent with the various embodiments disclosed herein, the housing may further comprise a display 110 with a user interface designed for simplicity of control in the operation of recording, arranging, looping, and playing a composition. The display may be, in some embodiments, a touch display. Looper 105 may be configured capture a signal and play the signal in a loop as a background accompaniment such that a user of looper 105 (e.g., a musician) can perform over top of the background loop. The captured signal may be received from, for example, an instrument such as a guitar or any apparatus producing an analog or digital signal.

Looper 105 may provide an intuitive user interface designed to be foot-operable. In this way, a musician can operate the looper hands-free. For example, looper 105 may comprise a plurality of foot-operable controls, displays, inputs, and outputs in a portable form factor. A foot-operable switch may be, by way of non-limiting example:

- a foot roller wheel 115 configured to, for example, adjust a parameter of a currently select track (e.g., volume), or be used for user interface navigation;
- a play/stop switch 120 configured to, for example, adjust a parameter of a song, song part(s), or track(s) (e.g, play/stop all);
- a first switch 125 configured to, for example, enable a user to navigate, select, transition between song parts;
- a second switch 130 configured to, for example, enable a user to navigate, select, transition, toggle between song tracks; and
- a third switch 135 configured to, for example, record, or re-record an input signal.

It should be understood that these switches may be programmable and perform different functions depending on the state of looper 105. For example, the switches might have a first function during a "performance" mode of operation and a second function during a "recording" mode of operation. Furthermore, the switches may be used to effect external device operations (e.g., a mobile phone app controlling a video recordation). Thus, the aforementioned functions disclosed with the switches are examples only and one of ordinary skill in the art would recognize that the switches may be programmed to perform any function or feature disclosed herein.

Accordingly, using the controls, a user of looper 105 may be receive, record, display, edit, arrange, re-arrange, play, loop, extend, export and import audio and video data. Looper 105 may be configured to loop various song parts, in parallel layers and sequential layers, and arrange the recorded song parts for live-playback, arrangements, and performances. As will be detailed below, looper 105 may be configured for a networked operation between multiple networked devices. The following provides some examples of non-limiting embodiments of looper 105.

In a first embodiment, looper 105 may comprise an enclosure having a display, a combined rotary knob/wheel and pushbutton, a control system, an audio subsystem, file management system a mobile app (connected via Bluetooth or other wired or wireless connection) and two (2) foot-switches for hands-free operation. In some embodiments, one footswitch may trigger the Record, Overdub and Play operations and another footswitch may trigger the Stop function (while looper 105 is playing) and Clear function (while looper 105 is stopped). The rotary knob/pushbutton control or a connected mobile app can be used to select songs and adjust the modes and settings of the device. The rotary knob/pushbutton control or a connected mobile app can be used to share files with other like-devices that are connected to a networked storage (e.g., cloud) as well.

In a second embodiment, looper 105 may comprise an enclosure having a display, a combined rotary knob and pushbutton, a control system, an audio subsystem, file management system a mobile app (connected via Bluetooth) and a Footswitch jack, Expression Pedal jack and/or MIDI port to enable hands-free operation with the addition of external devices. The rotary knob/pushbutton control or a connected mobile app can be used to select songs and adjust the modes and settings of the device. The rotary knob/pushbutton control or a connected mobile app can be used to share files with other like-devices that are connected to the cloud as well.

In a third embodiment, looper 105 may comprise an enclosure having a display, a combined rotary knob and pushbutton, a control system, an audio subsystem, file management system a mobile app (connected via Bluetooth), two (2) footswitches for hands-free operation and a Footswitch jack, Expression Pedal jack and/or MIDI port to expand the functionality of the device. One footswitch may be operative to trigger the Record, Overdub and Play operations and another footswitch may be operative to trigger the Stop function (while looper 105 is playing) and Clear function (while looper 105 is stopped). The rotary knob/pushbutton control or a connected mobile app can be used to select songs and adjust the modes and settings of the device. The rotary knob/pushbutton control or a connected mobile app can be used to share files with other like-devices that are connected to the cloud as well.

In a fourth embodiment, looper 105 may comprise an enclosure having a display, a combined rotary knob and pushbutton, a control system, an audio subsystem, file management system a mobile app (connected via Bluetooth) and four (4) footswitches for hands-free operation. A first footswitch may be configured to trigger the Record, Overdub and Play operations. A second footswitch may be configured to trigger the Stop function (while looper 105 is playing) and Clear function (while looper 105 is stopped). A third footswitch may be configured to control the selection/creation of a new Song Part. A fourth footswitch may be configured to control the Undo/Redo function associated with the current Song Part. The rotary knob/pushbutton can control or a connected mobile app can be used to select songs and adjust the modes and settings of the device. The rotary knob/pushbutton control or a connected mobile app can be used to share files with other like-devices that are connected to the cloud as well.

In a fifth embodiment, looper 105 may comprise an enclosure having a display, a combined rotary knob and pushbutton, a control system, an audio subsystem, file management system a mobile app (connected via Bluetooth), four (4) footswitches for hands-free operation and a Footswitch jack, Expression Pedal jack and/or MIDI port to expand the functionality of the device. A first footswitch may be operative to trigger the Record, Overdub and Play operations. A second footswitch may be operative to trigger the Stop function (while looper 105 is playing) and Clear function (while looper 105 is stopped). A third footswitch may be configured to control the selection/creation of a new Song Part. A fourth footswitch may be configured to control the Undo/Redo function associated with the current Song Part. The rotary knob/pushbutton can control or a connected mobile app can be used to select songs and adjust the modes and settings of the device. The rotary knob/pushbutton control or a connected mobile app can be used to share files with other like-devices that are connected to the cloud as well.

In some embodiments, additional footswitches may be provided for additional functions, such as, for example, but not limited to, loop control (e.g., a loop footswitch to create unlimited parallel loops). Further still, additional components may be provided to enable the various functions and features disclosed with regard to the modules. Various hardware components may be used at the various stages of operations follow the method and computer-readable medium aspects. For example, although the methods have been described to be performed by an enclosed apparatus, it should be understood that, in some embodiments, different operations may be performed by different networked elements in operative communication with the enclosed apparatus. Similarly, an apparatus, as described and illustrated in various embodiments herein, may be employed in the performance of some or all of the stages of the methods.

Figure 2A:
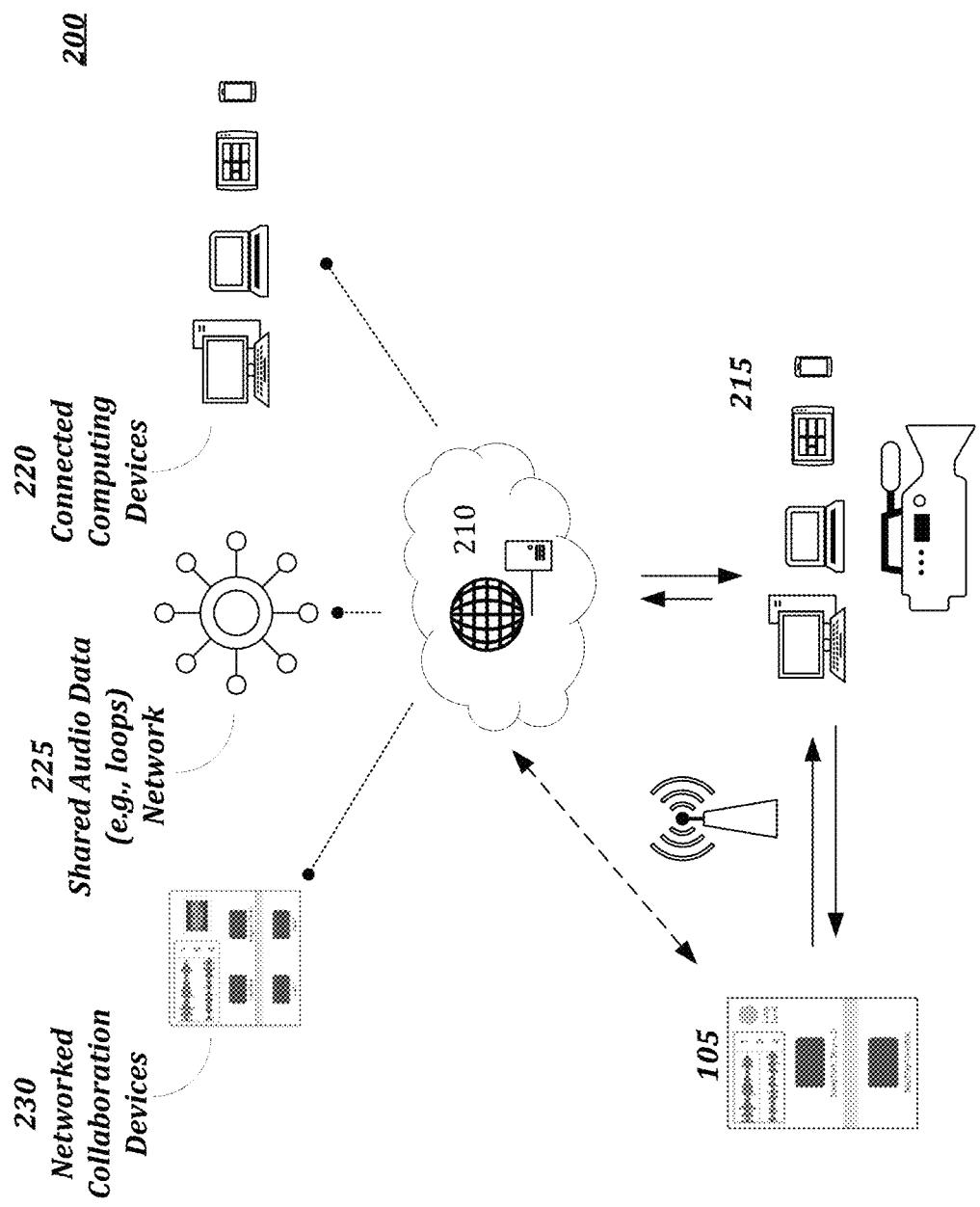
FIGS. 2A-2B illustrate a block diagram of an example operating environment for recording and rendering multimedia.

FIG. 2A illustrates one possible operating environment through which an apparatus, method, and systems consistent with embodiments of the present disclosure may be provided. By way of non-limiting example, components of system 200 (e.g., referred to herein as the platform) may be hosted on a centralized server 210, such as, for example, a cloud computing service. Looper 105 may access platform 600 through a software application and/or an apparatus consistent with embodiments of the present disclosure. The software application may be embodied as, for example, but not be limited to, a website, a web application, a desktop application, and a mobile application compatible with a computing device integrated with looper 105, such as computing device 700 described in FIG. 7. The software application may be configured to be in bi-directional communication with looper 105, as well as other nodes connected through centralized server 610.

In some embodiments, centralized server 210 may not be necessary and a plurality of loopers 230 may be configured for, for example, peer-to-peer connection (e.g., through a direct connection or a common access point). A plurality of nodes (looper 105 and networked loopers 230) in a local area (e.g., a performance stage) may all be interconnected for the synchronization of audio data and corresponding configuration data used to arrange, playback, record, and share the audio data. In this way, a collaboration module may be used in conjunction with the embodiments of the present disclosure.

Similarly, looper 105 may be configured for a direct connection to external devices 215. A software application 240 operable with both looper 105 and external device 215 may provide for the interaction between the devices to enable the various embodiments disclosed herein. The software application may further enable looper 105's interaction with server 210 (either indirectly through external devices 215 or directly through a communications module) and, thus, in turn, with network 225 and other networked computing devices 220. One possible embodiment of the software application may be provided by the suite of products and services provided by Intelliterran, Inc. dba Singular Sound.

As will be detailed with reference to FIG. 7 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

B. Embodiments of the Present Disclosure Provide a Software and Hardware Apparatus Comprised of a Set of Modules, Including, but not Limited to the Following Referring now to FIG. 2B, software application 240 may comprise, for example, but not be limited to, a plurality of modules including a network communication module, a midi controller, an external device controller, as well as internal control and file share protocols. These modules may enable the operation of the various looper modules 245 in conjunction with, for example, external devices 215 and datastores 235. In some embodiments, looper 105 may be configured for connection to server 210 without the need for an intermediary external device 215.

The operation segments of the platform may be categorized as, but not limited to, for example, the following modules:
  i. an input/output module;
  ii. a display module;
  iii. an arrangement module;
  iv. a playback module;
  v. a recording module; and
  vi. a collaboration module.

In some embodiments, the present disclosure may provide an additional set of modules for further facilitating the software and hardware platform. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage, feature or function disclosed with reference to one module can be considered independently without the context of the other stages, features or functions. In some cases, each stage, feature or function disclosed with reference to one module may contain language defined in other modules. Each stage, feature or function disclosed for one module may be mixed with the operational stages of another module. It should be understood that each stage, feature or function can be claimed on its own and/or interchangeably with other stages of other modules. The following aspects will detail the operation of each module, and inter-operation between modules.

a. An Input/Output Module

The platform may be configured to receive audio data. As disclosed in greater detail below, the audio data may be received by, for example, an input signal into looper 105. The input may be received from a wired or wireless medium. For example, the input may be a direct wired signal (e.g., direct line input or removable memory storage) into the platform or wireless signal for importing audio data from an external data source (e.g., a near-field or network communication).

The received audio data may be associated with, for example, but not be limited to, at least one track corresponding to an analog audio signal, a digital audio signal, a MIDI signal, a data signal from an external computing device. As will be detailed below, the signals may be compiled into at least one track with an associated visual representation displayed by a display module.

The received audio data may further comprise configuration data. The configuration data may comprise, but not be limited to, for example:
  at least one arrangement parameter employed by an arrangement module configured to arrange the at least one track associated with the audio data;
  at least one playback parameter employed by a playback module configured to playback the at least one track associated with the audio data; and
  a display parameter employed by a display module configured to display the visual representation associated with the audio data.

In some embodiments, the configuration data may be saved as metadata and/or within a name of the corresponding data file. In this way, the arrangement of the data file may be based on said metadata and/or file name. The setting and manipulation of the configuration data may affect an operation of the various modules disclosed herein. In some embodiments, these configuration data may be embodied as user-configurable metadata to the audio data. User configuration may be enabled via user-selectable controls provided by the platform. In various embodiments, and as will be disclosed in greater detail below, the user-selectable controls may be tied to foot-operable switches of an apparatus associated with the platform. In turn, the foot-operated controls may enable a hands-free composition, management, navigation and performance of an audio production on the platform.

Figure 4A:
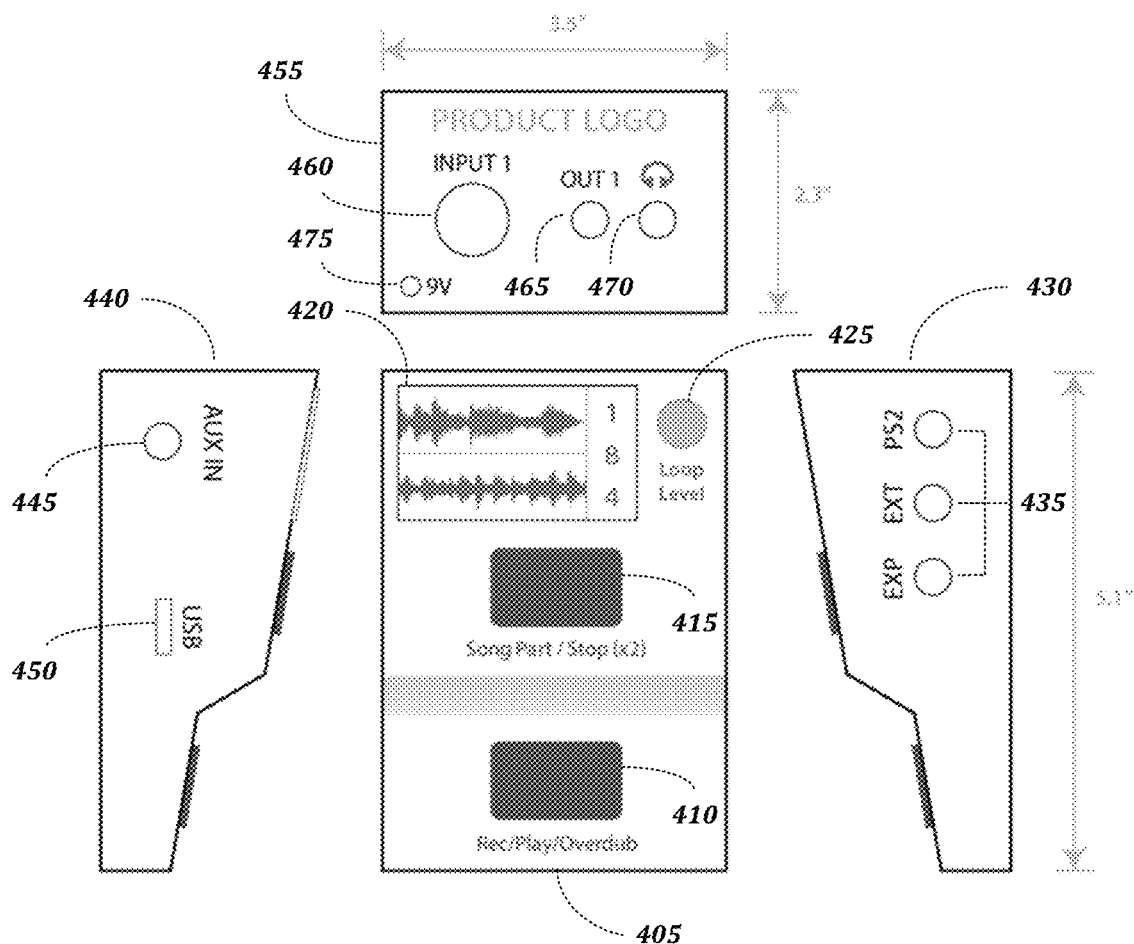
FIGS. 4A-4B illustrate additional embodiments of an apparatus for recording and rendering multimedia.
Figure 4B:
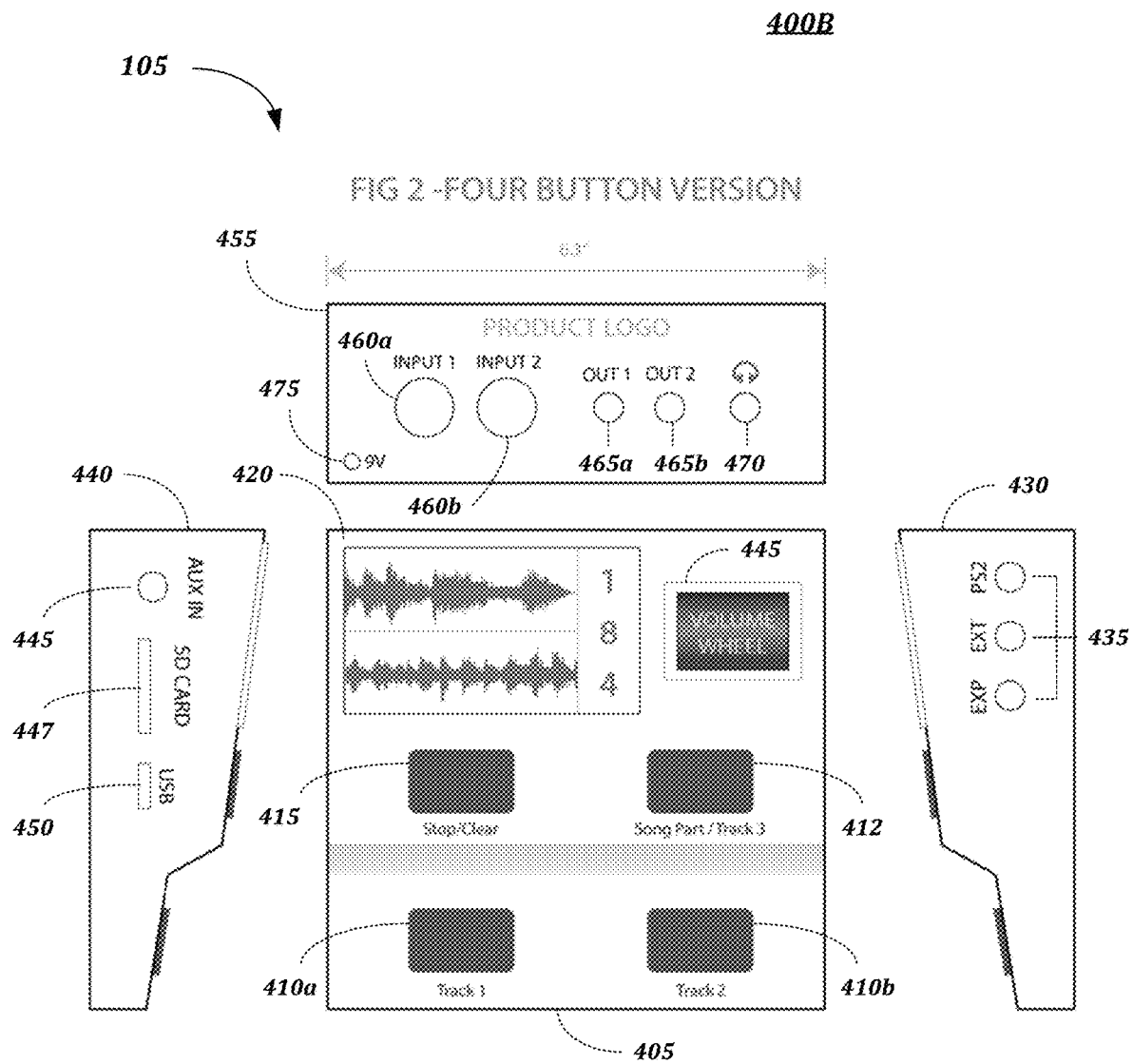

Still consistent with embodiments, looper 105 may comprise a plurality of outputs (see FIGS. 4A-4B. In some embodiments, output may be provided by, for example, an external device 215 or a networked device 230.

b. A Display Module

The audio data may be represented as, but not limited to, for example, audio waveforms, MIDI maps, and other visual representations of the audio data (collectively referred to as "visual representations"). The visual representations may be organized and arranged into visual segments. The visual segments may be determined from the configuration data associated with the audio data (e.g., the display parameter). FIGS. 5A-5B and FIG. 6A-6C provide a more detailed disclosure with regard to the visual representations.

The visual segments may then be organized and displayed through various apparatus and systems disclosed herein. For example, the visual representations may be provided on a display unit an apparatus associated with the platform. In some embodiments, the visual representations may further be provided on a remote display unit associated with, for example, a computing device in network communication with the platform.

The display of the visual segments may be configured to provide detailed contextual visual cues and feedback to enable composition, management, navigation and performance of, for example, but not limited to, an audio production through the platform (referred to herein as a "song"). By way of non-limiting example, a visual segment may provide a visualization associated with at least one of the following: a layer within a track, a track within a song part, a song part within a song, a song, a measure currently being played/recorded with a track, layer, song part, or song, and a timing associated with the playback/recording. In this way, the visual segments corresponding to song parts and song layers may be operative to serve as visual cues to performing ensemble and/or the audience members on upcoming song parts or changes in the song.

In some embodiments, where one apparatus of the present disclosure is in network communication with another similarly-functional apparatus, the visual representations provided to an end-user may correspond to the operation of the remote-apparatus (e.g., external devices 215). For example, a first apparatus may display visual representations associated with a remotely connected second apparatus so as to enable an end-user of the first apparatus to control playback and arrangement parameters associated with the second apparatus. As another non-limiting example, a first apparatus may display visual representations indicating an upcoming transition initiated by a remotely connected second apparatus.

c. An Arrangement Module

Figure 3A:
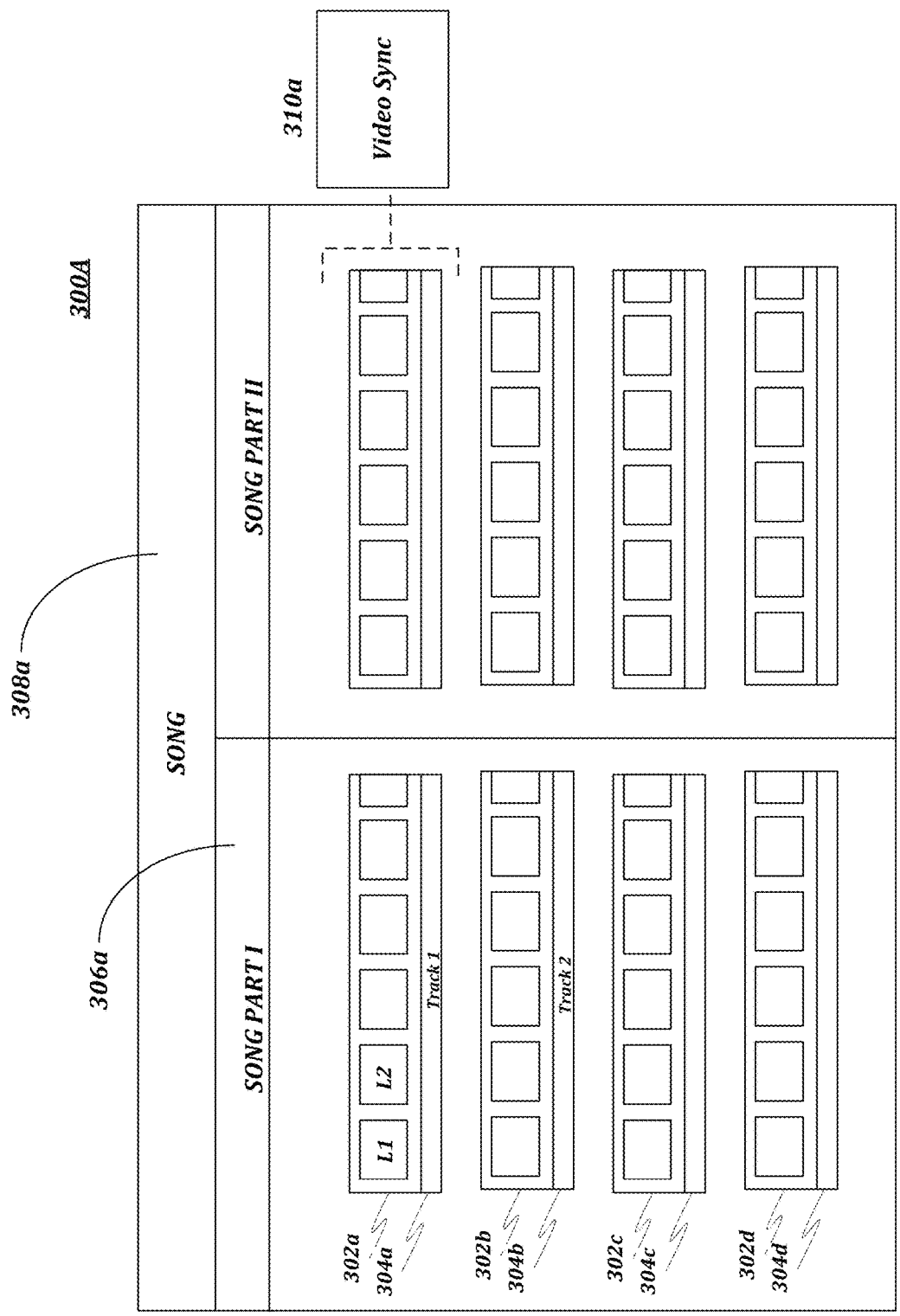

The platform may be configured to arrange one or more tracks associated with the audio data into, for example, but not limited to, a song comprised of song parts. The arrangement of the audio data may be based on, at least in part, an arrangement parameter associated with the audio data. FIG. 3A illustrates a song arrangement architecture 300A consistent with embodiments of the present disclosure.

A song may be segmented into, for example, but not limited to, layers 302a of a track 304a, tracks of a song part 306a, and song parts of a song 308a. Song parts 306a may be comprised of tracks 304a (e.g., looped segments). In turn, the platform may enable a user to, by way of non-limiting example, designate song parts, associate tracks to each song part, add/remove/edit/rearrange each track within a song part, and control the playback cycle and sequence of song parts. The arrangement module, at least in part, may enable the user to perform a plurality of the aforementioned operations, including, for example, transition from one song part to the next, record new tracks or layers, and turning on/off different tracks or layers in each song part.

In some embodiments, the song arrangement architecture 300A may include synchronized video content 310a associated with a track 304a. The synchronization may be enabled by, for example, a software application as described with regard to the platform (e.g., system 200). The synchronization may be enabled via metadata associated with audio and video tracks, and is detailed with reference to FIG. 3C below.

Still consistent with the embodiments herein, each song 308a may be comprised of one or more song parts 306a. Song parts 306a may be played in a user-selectable sequence. The user-selectable sequence may be triggered by a user-selectable control associated with the platform. The user-selectable control may be embodied as, but not limited to, a foot-operable switch embedded on an apparatus associated with the platform (e.g., on looper 105). In other embodiments, the user-selectable control may be configured remotely (e.g., external device 215).

The user-selectable control may be configured in a plurality of states. In this way, a single control may be enabled to perform a plurality of different operations based on, at least in part, a current state of the control, a previous state of the control, and a subsequent state of the control. Thus, the arranged playback of a subsequent song part may be associated with a state of the control designated to affect the arrangement configuration parameter associated with the song part. A display 100 of looper 105 may indicate a current state, and provide the appropriate labels for the selectable controls (e.g., 125-135).

Each song part 306a may be comprised of one or more tracks 204a. Tracks 304a may be structured as parallel tracks enabled for concurrent playback within song part 306a. The playback of the tracks may correspond to a user selectable control configured to set the at least one playback parameter. Each track may comprise one or more layers 302a. By default, a track may comprise a first layer. The duration of the first layer, measured in 'bars', serves as the duration of all subsequently recorded layers in each track. In contrast, a song part may comprise a plurality of tracks with varying duration.

As will be disclosed in greater detail below, the user-selectable control may be embodied as, but not limited to, a foot-operable switch embedded on an apparatus associated with the platform. In other embodiments, the user-selectable control may be configured remotely. As mentioned above, the user-selectable control may be configured in a plurality of states. In this way, the single control may be enabled to perform a plurality of different operations based on, at least in part, a current state of the control, a previous state of the control, and a subsequent state of the control. Thus, an "ON" or "OFF" playback state of a layer (e.g., parallel track of a song) may be associated with a state of a control designated to affect the playback configuration parameter associated with the track.

The arrangement module may also embody the platform's ability to add, remove, modify, and rearrange the song by virtue of the song's corresponding parts, tracks, and layers. As will be disclosed in greater detail below, the rearrangement of the aforementioned components may be associated with the modification of configuration data tied to the audio data, including, but not limited to, pitch and tempo modulation.

d. A Playback Module

The platform may be configured to playback the song parts, tracks, and layers. The playback may be based on, at least in part, a playback configuration parameter associated with the audio data corresponding to the song. It should be noted that the disclosure of functions and features with regard to a track, as used herein, may incorporate by reference one or more layers comprising the track. Furthermore, the disclosure of functions and features with regard to a layer, as used herein, may be similarly applicable to the functions and features of a track. Thus, a reference to a function, feature, or limitation for a layer may imply the same function, feature, or limitation upon a track (e.g., a single layer track).

Consistent with embodiments of the present disclosure, the platform may receive a playback command. The playback command may be comprised of, but not limited to, for example, a straight-through playback command and a loop playback command. A straight-through command may be configured to cause a sequential playback of each song part between a starting point and an ending point, in a corresponding playback sequence for each song part. A looped playback command may be configured to cause a looped playback of a song part. In some embodiments, the platform may be enabled to loop a plurality of song parts in between a designated loop starting point and a loop ending point. In these embodiments, each song part may have a different quantity of loop cycles before a transition to the subsequent song part.

Still consistent with embodiments of the present disclosure, the platform may be configured to transition between playback types and song parts. For example, a transition command may be received during a playback of a song part. The command may cause the platform to playback a different song part. The different song part may be determined based at least in part on a song part in subsequent playback position. The subsequent playback position may set by the configuration data associated with the song the song part, and the tracks therein.

In some embodiments, the different song part may be determined based at least in part on a song part associated with a state of a selectable control that triggered the transition command. As will be disclosed in greater detail below, the selectable control may comprise multiple states corresponding to different user engagement types with the selectable control. Each state may be associated with a playback position of a song part, and, when triggered, may cause a transition of playback to a song part corresponding to the playback position.

Still consistent with embodiments of the present disclosure, the playback of each song, song part, and track, may be regulated by the configuration data associated with the audio data corresponding to the song, song part, and track. The configuration parameter may comprise at least one playback parameter comprising at least one value associated with, but not limited to, at least one of the following: a tempo, a level, a frequency modulation, and effect.

As will be disclosed in greater detail below, the selectable control may be embodied as, for example, a foot-operable switch or configured remotely. Having set the playback parameter values, the platform may output a playback signal. The output signal may transmitted through a direct line output. In some embodiments, the output signal may be transmitted by a communications module operatively associated with a near-field or network connection.

e. A Recording Module

A recording module may be configured to capture signals and data received from the input module. The details to such operations are detailed below. Consistent with embodiments of the present disclosure, the recording module may be further configured to extend a song part based on a duration of, for example, a newly recorded track. The extension of a song part may comprise, but not be limited to, for example, automatically extending other song part layers (e.g., an initially recorded layer) by recording a longer secondary layer on top of the other song part layers. As will be further detailed below, the length of the other song part layers may be extended, in whole or fractional increments, to match the length of the first layer within the track. Similarly, embodiments of the present disclosure may enable a user to extend the duration of a track by recording an overdub to a track layer that is longer than the initial recording.

Still consistent with embodiments of the present disclosure, a performance capture mode may be provided (also referred to as 'performance mode'). FIG. 3B illustrates a performance mode architecture 300B. The performance capture mode may allow the creation a single recorded track 315 concurrently recorded with the playback of individual loops. This enables the capturing of a non-looped performance (e.g. a guitar solo over a looped chord progression) while playing back the various looped tracks in various song parts. In some embodiments, and as will be detailed with reference to FIG. 3C, the capture performance may be comprised of a single file. The single file may, in turn, be published. In this way, the performance can be shared for listener enjoyment or in order to collaborate with other musicians to add additional musical elements to the work.

A user may enter performance mode by operation of one or more looper switches. In this way, during the same session, a user can initiate performance mode without any secession of the session activity. In other words, embodiments may enable the user to enter into performance mode without resetting the session. Once receiving a command to enter performance mode, looper 105 may be operative to begin performance mode recording at, for example, an upcoming bar or at the resetting of a corresponding song part. An external device may also be triggered to begin a corresponding recordation. Similarly, a user may operate one or more looper switches to exit performance mode. In other embodiments, performance mode may be set as a parameter prior to commencing a session.

In performance capture mode, as the musician plays and operates looper 105, the musician may enable and disable various background layers/loops with a song part. The musician may further transition from one song part to the next song part. The performance may be captured as a single, sharable file through the platform to enable collaboration. In some embodiments, the performance may be captured as, for example, metadata along with the various song layers and parts. Then, a user of the platform can edit/modify the performance without needing to re-capture the performance.

For example, the metadata data may include, but not be limited to, the time of each layer/parts playback and various data associated therewith. Time signature and tempo information may be saved so that this file can be used in other devices with the quantizing feature enabled (in accordance to a collaboration module detailed below). This information may be saved dynamically so that if the tempo is changed during a performance, this information is captured as it happens and can adjust collaborating devices accordingly. A digital marker may be used for various actions, such as changing a song part and the resulting performance file displays these changes visually so that collaborating musicians can see where these actions have taken place and can prepare themselves accordingly.

f. Video Controller Module

Embodiments of the present disclosure may provide a software application for interfacing looper 105 with external devices 215. As one example, a user may install a smartphone application to sync the operation of looper 105 with the smartphone. The application may be configured to operate the video controller module to synchronize the smartphone's recording a video with looper 105's recording of an audio signal (e.g., a track). In a plurality of ways, the application may combine or otherwise stitch the captured video content with the captured track. In turn, each time the particular track is played back, the application may cause a playback the captured video segment associated with the recorded track.

Figure 3C:
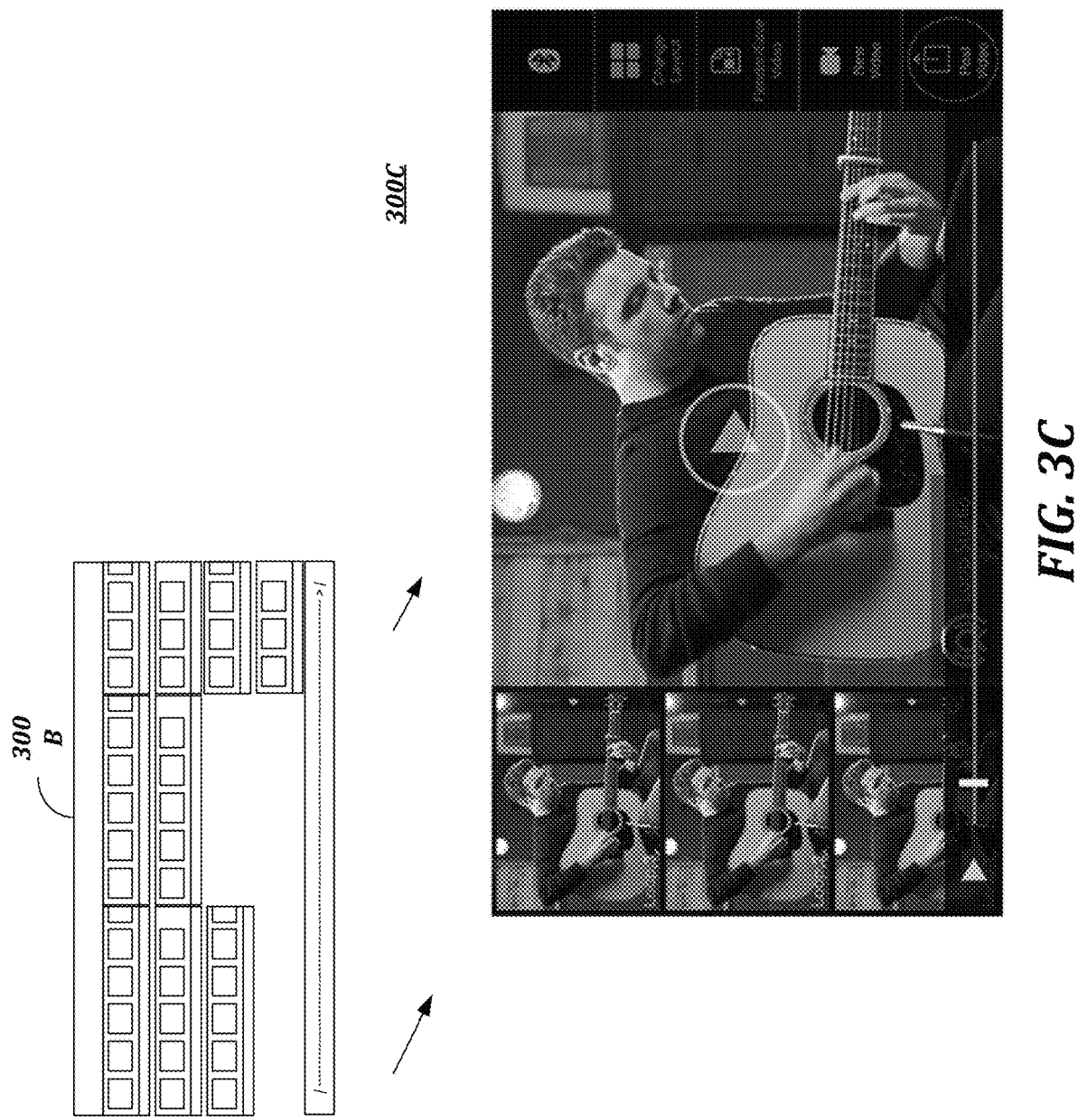

FIG. 3C illustrates on example of a rendered multimedia file 300C in accordance with embodiments of the present disclosure. One application of this functionality may be to record music videos of a musician performing each recorded track. For example, the musician may position their smartphone camera to capture the musician's performance. Then, as the musician operates looper 105, the software application may operate the smartphone so as to capture a video segment associated with a currently recorded track. In this way, the musician's trigger of a record function of audio on looper 105 also triggers a record function of video on the smartphone. Then, each recorded video may be assigned to a corresponding audio track for playback and rendering.

For example, when a song part is comprised of, for example, six song parts, all six videos associated with each track is played back synchronously with the audio. Continuing with the same example, when one track within a song part is turned off, the video associated with the track is also turned off when the user transitions from one song part to the next song part, the video for the new tracks is played back.

Embodiments of the present disclosure may provide for a plurality of video and audio synchronization methods. For example, in some embodiments, the recorded video data may be stored in a first datastore, while the recorded audio data may be stored in a second datastore. The data stores may or may not be local to one another. Herein, the software application may read the metadata associated with each video and audio dataset and trigger a simultaneous playback. In some embodiments, the playback of the video may be performed on an external device, while the playback of the audio may be performed by looper 105. The software application may monitor, for example, the playback commands provided by a user on either the looper 105 or the external device and cause a simultaneous playback to be performed on both devices. In other embodiments, the data stores may be local to one another and, therefore, operated upon by the same device (e.g., for playback and rendering).

Some embodiments may employ time-based synchronization using time-coding techniques known to those of ordinary skilled in the field. Other embodiments may further employ unique IDs to each audio and video segment. The platform may in turn use these IDs to rearrange (via reference) of the audio files to create a composition is close to how we will track the loop order of the user's performance (e.g., in performance mode).

Accordingly, platform may be configured to operate external devices 215 in parallel to the operation of looper 105. So, as soon as a user starts a recording session activity, the platform may be configured to automatically turn on/off video recording, label/apply metadata to the captured video components, and then, during the rendering of the track (e.g., after recording performance mode), the system will use metadata of those video files to sync the captured video segments to the right loops in the song.

It should be understood that the use of metadata only provides for one potential solution to synchronizing multimedia content. In other solution, external lists of data (much like a database) may be employed.

g. A Collaboration Module

A collaboration module may be configured to share data between a plurality of nodes in a network. The nodes may comprise, but not be limited to, for example, an apparatus consistent with embodiments of the present disclosure. The sharing of data may be bi-directional data sharing, and may include, but not be limited to, audio data (e.g., song parts, song tracks) as well as metadata (e.g., configuration data associated with the audio data) associated with the audio data.

Still consistent with embodiments of the present disclosure, the collaboration module may be enabled to ensure synchronized performances between a plurality of nodes. For example, a plurality of nodes in a local area (e.g., a performance stage) may all be interconnected for the synchronization of audio data and corresponding configuration data used to arrange, playback, record, and share the audio data.

In some embodiments of the present disclosure, any networked node may be configured to control the configuration data (e.g., playback/arrangement data) of the tracks being captured, played back, looped, and arranged at any other node. For example, one user of a networked node may be enabled to engage performance mode and the other networked nodes may be configured to receive such indication and be operated accordingly. As another example, one user of a networked node can initiate a transition to a subsequent song part within a song and all other networked nodes may be configured to transition to the corresponding song-part simultaneously. As yet another example, if one networked node records an extended over-dub, then the corresponding song part on all networked nodes may be similarly extended to ensure synchronization. In this way, other functions of each networked node may be synchronized across all networked nodes (e.g., play, stop, loop, etc.).

By way of further non-limiting example, the synchronization may ensure that when one node extends a length of a song part, such extension data may be communicated to other nodes and cause a corresponding extension of song parts playing back on other nodes. In this way, the playback on all nodes remains synchronized. Accordingly, each node may be configured to import and export audio data and configuration data associated with the audio data as needed, so as to add/remove/modify various songs, song parts, and song layers of song parts.

Furthermore, in accordance to the various embodiments herein, the collaboration module may enable a first user of a first node to request additional tracks for a song part. A second user of a second node may accept the request and add an additional track to the song part. The updated song part, comprised of the audio data and configuration data, may then be communicated back to the first node. In some embodiments, the second node may extend the length of the song part (see recordation module details) and return updated audio data and configuration data for all song tracks. The updated data may include datasets used by a display module to provide visual cues associated with the updated data (e.g., transition points between song parts).

The collaboration module may further be configured to send songs, song parts, song tracks and layers, and their corresponding configuration data to a centralized location accessible to a plurality of other nodes. The shared data can be embodied as, for example, a request for other nodes to add/remove/modify layers and data associated with the shared data. In some embodiments, the centralized location may comprise a social media platform, while in other embodiments, the centralized location may reside in a cloud computing environment.

Further still, embodiments of the present disclosure may track each nodes access to shared audio data as well as store metadata associated with the access. For example, access data may include an identify of each node, a location of each node, as well as other configuration data associated with each node.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

C. Embodiments of the Present Disclosure Provide a Hardware and Software Apparatus Operative by a Set of Methods and Computer-Readable Media Comprising Instructions Configured to Operate the Aforementioned Modules and Computing Elements in Accordance with the Methods The methods and computer-readable media may comprise a set of instructions which when executed are configured to enable a method for inter-operating at least the modules illustrated in FIGS. 2A and 2B. The aforementioned modules may be inter-operated to perform a method comprising the following stages. The aspects disclosed under this section provide examples of non-limiting foundational elements for enabling an apparatus consistent with embodiments of the present disclosure.

Although the method stages may be configured to be performed by computing device 700, computing device 700 may be integrated into any computing element in system 200, including looper 105, external devices 215, and server 210. Moreover, it should be understood that, in some embodiments, different method stages may be performed by different system elements in system 200. For example, looper 105, external devices 215, and server 210 may be employed in the performance of some or all of the stages in method stages disclosed herein.

Furthermore, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated.

A computing device 700 may be configured for at least the following stages.
1. Recording a signal, wherein the signal comprises least one of the following:
   Wired signal,
   Wireless signal,
   An analog signal, and
   digital signal.
2. Capturing the received signal as audio data, wherein the audio data is segmented into at least one track;
   Wherein the at least one track comprises an audio track, and
   Wherein the at least one track comprises a midi track.
3. Associating configuration data with the at least one track, wherein the configuration data comprises at least one of the following:
   Arrangement data employed configured to specify an arrangement of the at least one track within a song part of a song,
   Playback data employed configured to specify playback properties of the at least one track, and
   A display data employed configured to specify a visual representation associated with the at least one track.
4. Arranging the at least one track based on the at least one arrangement parameter, wherein the at least one arrangement parameter determines a position of the at least one track, the position being at least one of the following:
   A layer within a track,
   A track within a song part, and
   A song part within a song;
5. Playing back at least one song part within a song,
   Wherein the playback is configured for at least one of the following:
   a. Looping a song part, wherein looping the song part comprises:
      i. Playing a plurality of parallel layers within a track,
      ii. Playing a plurality of tracks within the song part,
      iii. Switching on/off the playback of layers within a track;
      iv. Switching on/off the playback of tracks within a song part;
   b. Transitioning to from a first song part to a second song part.

The computing device 700 may be further configured as follows:
   Wherein configuration parameters are stored as metadata associated with the audio data,
   Wherein the configuration parameters are user-configurable,
      Wherein the configuration parameters are user-configurable based on selectable controls, hands-free controls of an apparatus,
   Wherein additional configuration parameters are associated with each song part of the song, and
   Wherein yet additional configuration parameters are associated with the song.

The aspects disclosed under this section provide examples of non-limiting functions that may be performed on a stand-alone, self-enclosed apparatus, that is operable by foot controls in a simple and intuitive way, as will be disclosed in detail below. Accordingly, computing device 700 may be further configured for the following.
1. Displaying visual representations associated with the audio data, wherein displaying the visual representations comprises:
   Displaying a visual segment associated with at least one of the following:
      A track within a song part,
      A song part within a song,
      A song,
      A measure currently being played/recorded with the track, and
      A timing associated with the playback/recording.
2. Displaying visual cues associated with at least one of the following:
      A playback of the visual segment,
      A transition associated with the visual segment, and
      A recordation associated with the visual segment.
   Wherein the visual ques facilitate the navigation between song parts within a song; and
   Wherein the visual ques identify layers and/or tracks being played back within a song part.
3. Recording a signal, Simple Layering Embodiments Wherein the recording of the subsequent signal is captured as a new layer within a track of a song part to which the subsequent signal is being recorded,
Wherein the song part comprises at least one track being played back during the recording of the subsequent signal based upon playback parameters associated with the tracks,
Wherein a first layer of a track determination the length/duration of the track such that all subsequent layers recorded to the track are limited to the same length/duration,
   Wherein subsequent tracks are padded to fill the length/duration of the track as needed, and
Wherein a song part may comprise tracks of varying length/durations;

Loop Extension Embodiments

Wherein the recording of the subsequent signal is configured to cause an extension of the track to which the subsequent signal is being recorded, wherein the track is extended by at least one of the following:

a duration of the new layer corresponding to the recording of the subsequent signal, and a quantized increment of the layers within the extended song part;

Wherein the recording of the subsequent signal is configured to cause an extension of the song part to which the subsequent signal is being recorded, wherein the song part is extended by at least one of the following:

a duration of the new track corresponding to the recording of the subsequent signal, and a quantized increment of the tracks within the extended song part;

Performance Mode Embodiments

A. Receiving a command to engage in a performance capture mode of recording; and B. Recording a received signal in performance capture mode, wherein the recording of the signal comprises enabling at least one of the following operations to be performed by the user during the playback of the recording of the subsequent signal:

initiating playback of the song at a starting point determined by a user, receiving at least one modification to at least one playback parameter of at least one track within the song part currently being played back (e.g., turning song part tracks or layers on/off), continuing playback of the song part with the modified at least one playback parameter, receiving at least one transition command to switch to another song part, transitioning playback to the other song part, receiving at least one modification to at least one playback parameter of at least one track within the song part currently being played back (e.g., turning song part tracks or layers on/off), continuing play back of the song part with the modified at least one playback parameter, and terminating play back of the song at a termination point determined by the user;

Rendering as a File Embodiments

Wherein the recording of the subsequent signal further comprises capturing, as a single file, the recorded signal along with the playback in accordance to the aforementioned user operations enabled during the playback, and Wherein the recording of the subsequent signal further comprises capturing, as a single file, the recorded signal without the playback in accordance to the aforementioned user operations enabled during the playback;

Rendering with Metadata Embodiments

Wherein the recording of the subsequent signal further comprises:

capturing, as a single file, the recorded signal as at least one track within at least one song part, establishing metadata corresponding to the user operations enabled during the playback packaging each track of each song part within along metadata so as to enable a playback of the song as captured during the recordation of the subsequent signal;

4. Enabling collaboration on at least one of the following: a song, song part, and song layers, Wherein enabling the collaboration on the song, song part, and song tracks and layers comprises at least one of the following: Remote Operation Embodiments A. Sharing data between a plurality of networked devices, wherein sharing the data comprises the bi-directional sharing of at least one of the following:

audio data comprising at least one of the following: an audio track and a midi track, wherein the capture of audio data at one node is configured to be shared with another node, and configuration parameters associated with the audio data, comprising at least one arrangement parameter, at least one playback parameter, and at least one display parameter, wherein the modification of a configuration parameter associated with the audio data at one node is configured to cause the modification of the configuration parameter at another node, including, for example:

a modification of a playback parameter, enabling a first node to turn on/off the playback of loops associated with a second node, a modification of an arrangement parameter, enabling a first node to effect of a transition from a first song part to another song part on a second node, and a modification of a display parameter, enabling an update to the visual cues/audio data information indicating the playback layers and upcoming transitions, Requesting and Sharing Embodiments A. Initiating a request, by a first node, for audio data from a second node, wherein the request is accompanied by audio data and configuration parameters associated with the first node, B. Receiving the request, from the first node, at the second node, wherein receiving the request comprises loading the audio data and configuration parameters received from the first node at the second node, C. Providing, by the second node, the requested audio data to the first node, wherein providing the requested audio data comprises providing at least one of the following: a layer, a track, a song part, and a song;

Remote Apparatus Synchronization Embodiments

A. Enabling collaboration between nodes with the requested and provided data, wherein enabling collaboration nodes comprises:

the synchronized display of visual segments and visual ques between the plurality of nodes;

the synchronized operation of the configuration parameters associated with the audio data between the plurality of nodes;

the synchronized extension of song parts in accordance to the aforementioned recording stage; and the synchronized capture of a performance in performance mode in accordance to the aforementioned recording stage.

Although the stages are disclosed in a particular order, it should be understood that the order is disclosed for illustrative purposes only. Stages may be combined, separated, reordered, and various intermediary stages may exist.

Accordingly, it should be understood that the various stages, in various embodiments, may be performed in arrangements that differ from the ones detailed below. Moreover, various stages may be added or removed from the without altering or deterring from the fundamental scope of the depicted methods and systems disclosed herein.

II. Hardware Components and Functions

Hardware embodiments of looper 105 are not limited to any particular design. The following presents a plurality of structural variations to the hardware design of looper 105. It should be noted, dimensions are provided for illustrative purposes only.

In general, the hardware may be configured to operate in a plurality of states. Each state may provide for a corresponding function to a switch or button. By way of non-limiting example, and referring back to FIG. 1, in a "Two Song Part" mode, switch 125 may serve as an 'undo' function, undoing the recordation of the most recent layer. A subsequent selection of switch 125 may cause a 'redo', thereby serving as an effect mute/unmute feature a most recently recorded layer in a track. Switch 130 may be an RPO for Song Part I, while Switch 135 may be an RPO for Song Part II.

As another, non-limiting example, in a "Six Song Part" mode, switch 125 may serve as to select, queue, and transition to another song part. Switch 130 may serve to select, queue, and transition to another song track. Display 110 may provide visual indicators as to a queued or selected song part or track. Switch 135 may be an RPO for a selected track in the selected song part. Here, the undo/redo function may be provided by, for example, holding the RPO switch.

In various embodiments, external switches and controls may be employed. By way of a non-limiting example, a drum machine such as a BEATBUDDY® may be configured to interact with looper 105. The configuration may enable a transition of a state in the drum machine to cause a transition in playback of, for example, a song part in looper 105. Other external controllers may be employed, such as midi controllers or other networked loopers 230. Moreover, looper 105 may similarly affect the operation of external devices.

While FIG. 1 illustrates on possible embodiment of looper 105, FIGS. 4A and 4B illustrate alternative configurations. The following is a listing of the components in the alternative configures.

FIGS. 4A—Configuration 400A
  Front Side 405
    First Button 410—Record, Play, Overdub
    Second Button 415—Song Part/Stop (×2)
    Display 420
    Loop Level Knob 425
  Right Side 430
    Outputs 435a
    Output 435b
    Output 435c
  Left Side 440
    Input AUX 445
    USB 450
  Front Side 455
    Input 1 460
    Output 1 465
    Headphones 470
    Power 475

FIGS. 4B—Configuration 400B
  Top Side 405
    First Button 410a—Track 1
    Second Button 410b—Track 2
    Third Button 412—Song Part/Track 3
    Fourth Button 415—Stop/Clear
    Display 420
    Volume Wheel 425
  Right Side 430
    Outputs 435a
    Output 435b
    Output 435c
  Left Side 440
    Input AUX 445
    SD Card 447
    USB 450
  Front Side 455
    Input 1 460a
    Output 1 465a
    Input 2 460b
    Output 2 465b
    Headphones 470
    Power 475

III. User Interface Components and Functions

Figure 5A:
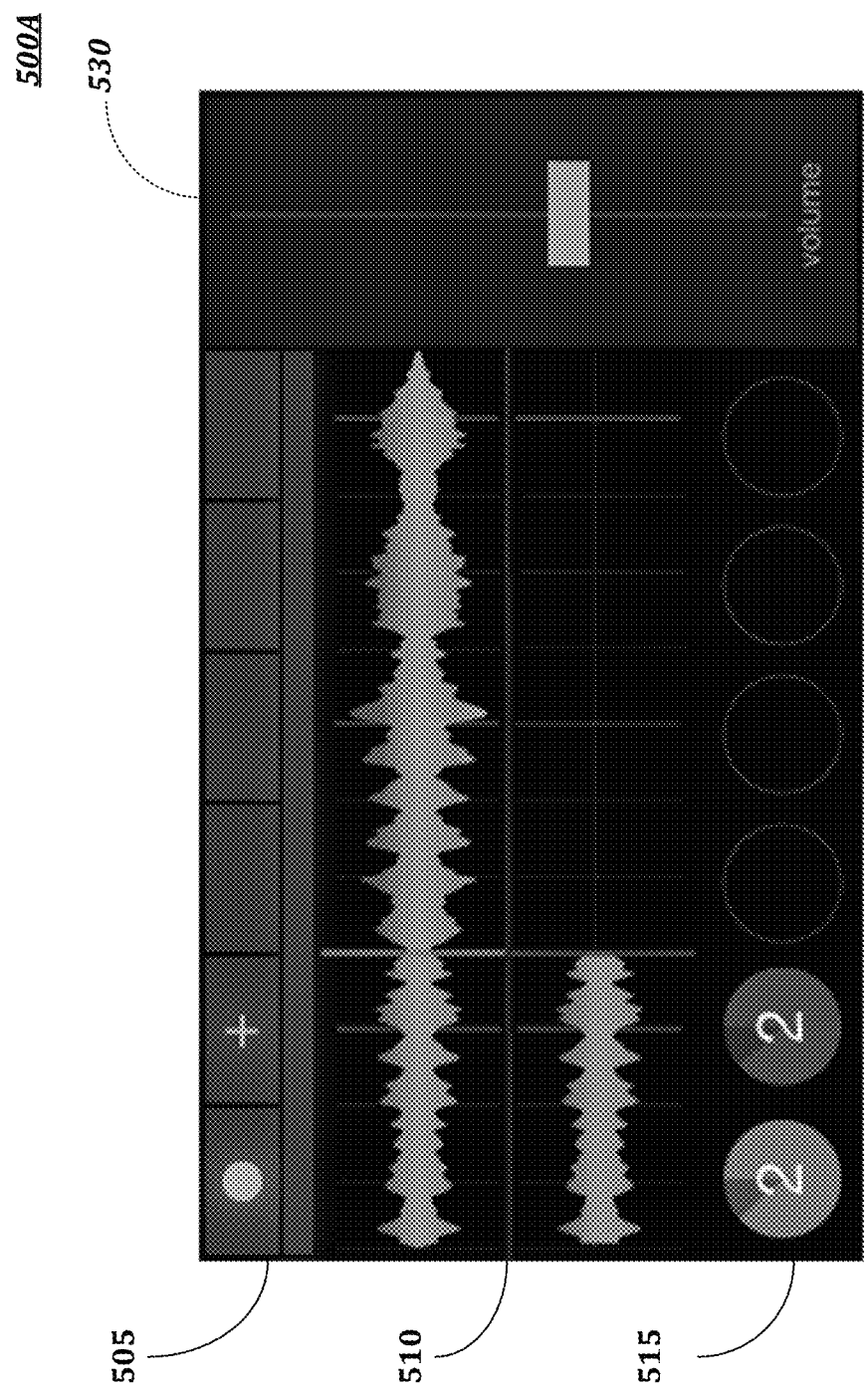
FIGS. 5A-5B illustrate an example user interface for recording and rendering multimedia.
Figure 5B:
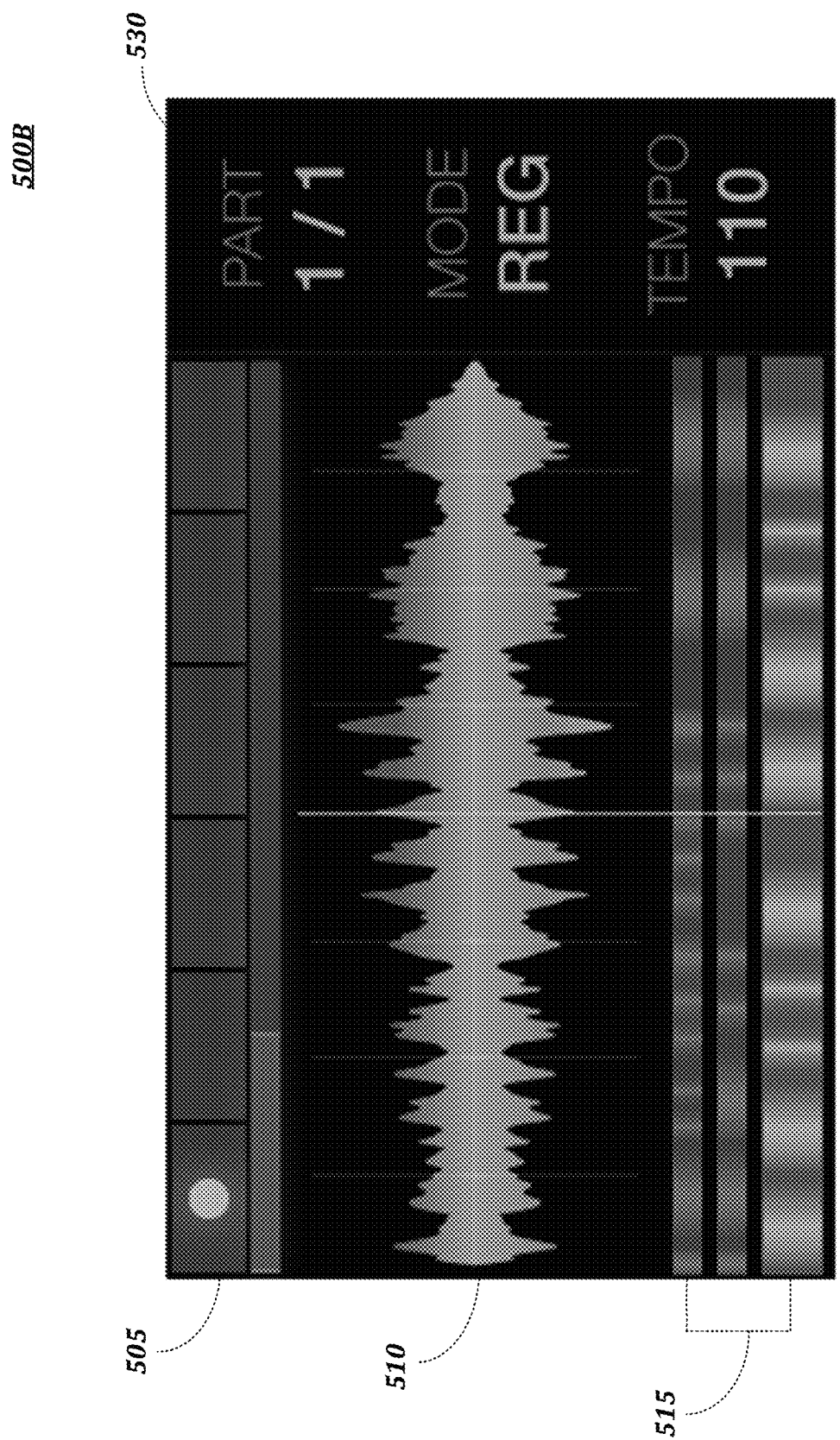

FIG. 5A-5B illustrate indicators of song, track, and layer playback, and will be detailed below. For instance, as shown in a user interface 500A illustrated in FIG. 5A, track playback control and progress may be provided by indicators positioned in a first segment 505 of display 110, song part playback control and progress may be provided by indicators positioned in a second segment 515 of display 110, and track or layer waveform may be positioned in a third segment 510 of display 110. In some embodiments, as illustrated in FIG. 5B, tracks may be represented as density charts, indicating the signal density in track overlays.

Looper 105 may display a plurality of waveform data in third segment 510. For example, the segment 510 may be comprised of a top waveform and a bottom waveform. The top waveform may display a first or most recent track that is recorded for a song part, while the bottom waveform may display a second or previous track that was recorded for the song part. In the event that a song part comprises more than two tracks (e.g., six tracks), tracks 3-6 may alternate or auto-group as overlays on top of waveform 1 and waveform 2 (see segment 515 in user interface 500B). In such embodiments where the waveform are implemented as overlays, the platform may detect the density of the waveforms and then group high density ones with low density ones. For example, high density representations tend to correspond to strums of a guitar which are visually thick, while low density representation tend to correspond to a rhythmic portion, which visually have pulses.

Accordingly, embodiments of the present disclosure may provide a method for displaying a waveform using gradients. The gradients may be comprised of variations to, for example, color density of at least one color. The variations in color density may depict the relative or absolute magnitude of a corresponding waveform.

Continuing with the example, each new parallel loop recording (or overdub) will push a previously recorded waveform down into the gradient display section 515 and represented in gradient form. There may be a plurality of gradients displayed in section 515, with a base waveform (first recorded waveform) displayed with a larger visual representation. Different quantities of gradient waveforms may be displayed in varying colors, intensities, and sizes.

It should be noted that one benefit of the gradient form is that it communicates pulses and their magnitudes without the visual "noise" of a waveform. These elements of a waveform may be important for a musician to know, to ensure synchronization and timing across a set of parallel loops. Consider a musician playing and recording multiple waveforms stacked in a parallel loop. In this scenario, one waveform may be visually digestible to the musician. More than one waveform becomes more difficult to follow. The gradient form is a clean way for the user to see and easily decoded the location of the dynamics in a track.

Consistent with some embodiments of the present disclosure, third segment 510 may be configured to display layer information corresponding to each track, much like of the display of the track information corresponding to each song part. In this instance, both the display and corresponding button functionality may be modulated/transposed (e.g., the 'song part' display and functions now correspond to 'track' display and functions, and the previous 'track' display and functions may then correspond to 'layer' display and functions). In this way, the buttons and switches of looper 105 may be configured to navigate songs, song parts, tracks, and layers, and the display 110 as well as user interfaces may be updated in accordance to the functionality state of looper 105.

Looper 105 may display song part data in a first segment 505. In this segment, a user may be enabled to ascertain a current song part as well as a queued song part. The queued song part may be displayed with, for example, a special indicator (e.g., a color or flashes). The user may further be enabled to add/remove song parts by activation of a corresponding song part switch. The song part switch may operate to queue a song part and the RPO button may trigger the queued song part to play (if there at least one existing track in the queued song part) and record (if there is not an existing track in the queued song part). A track part switch may function in a similar way.

Looper 105 may display track data in a second segment 515. In this segment, a user may be enabled to ascertain the tracks being played back and the track being recorded with a various of indicators. The indicators may display the progress of the playback or recordation within a looped measure. Each indicator may have a visual status for current tracks and queued tracks.

Figure 6A:
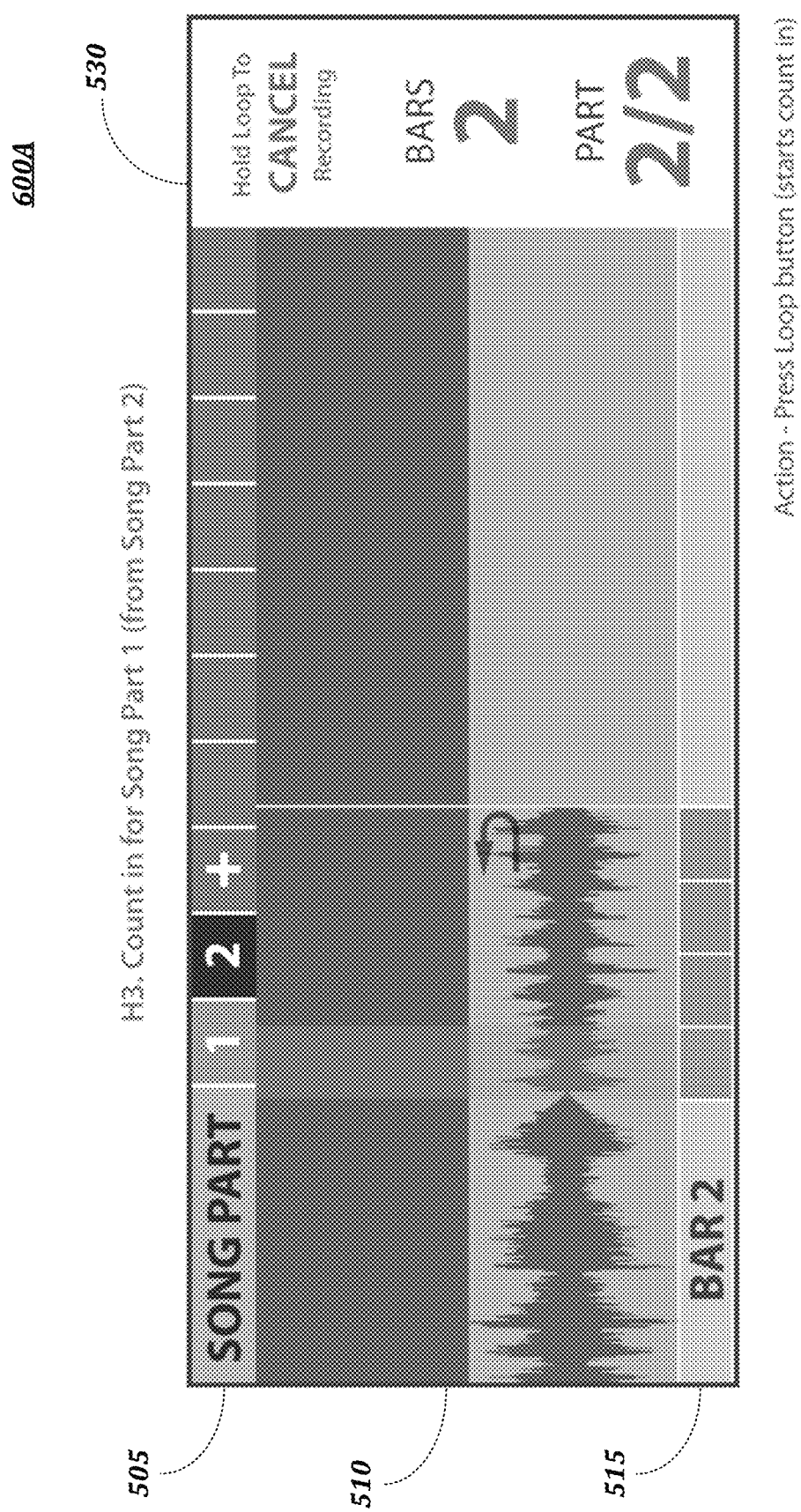
FIGS. 6A-6C illustrate additional examples of a user interface for recording and rendering multimedia.
Figure 6B:
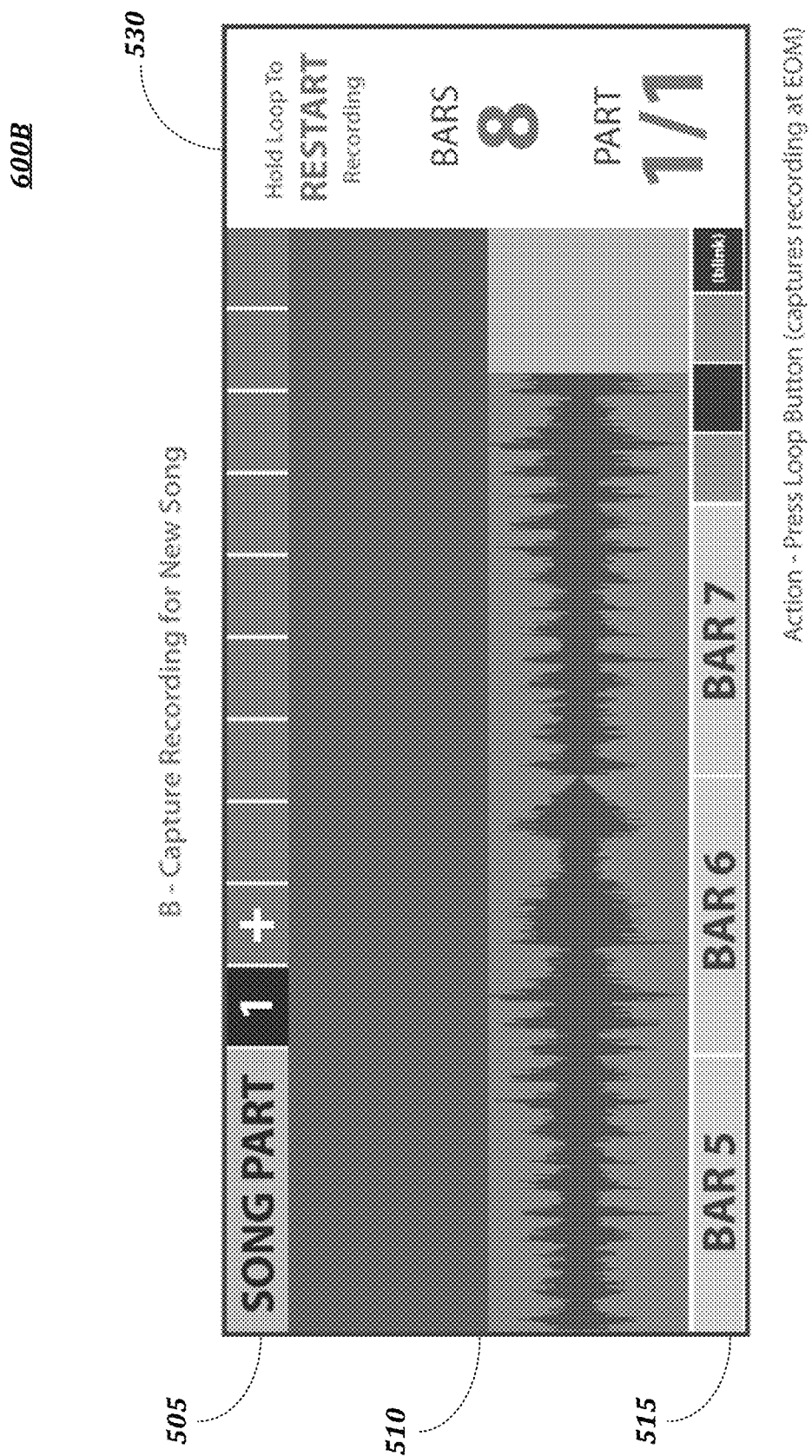
Figure 6C:
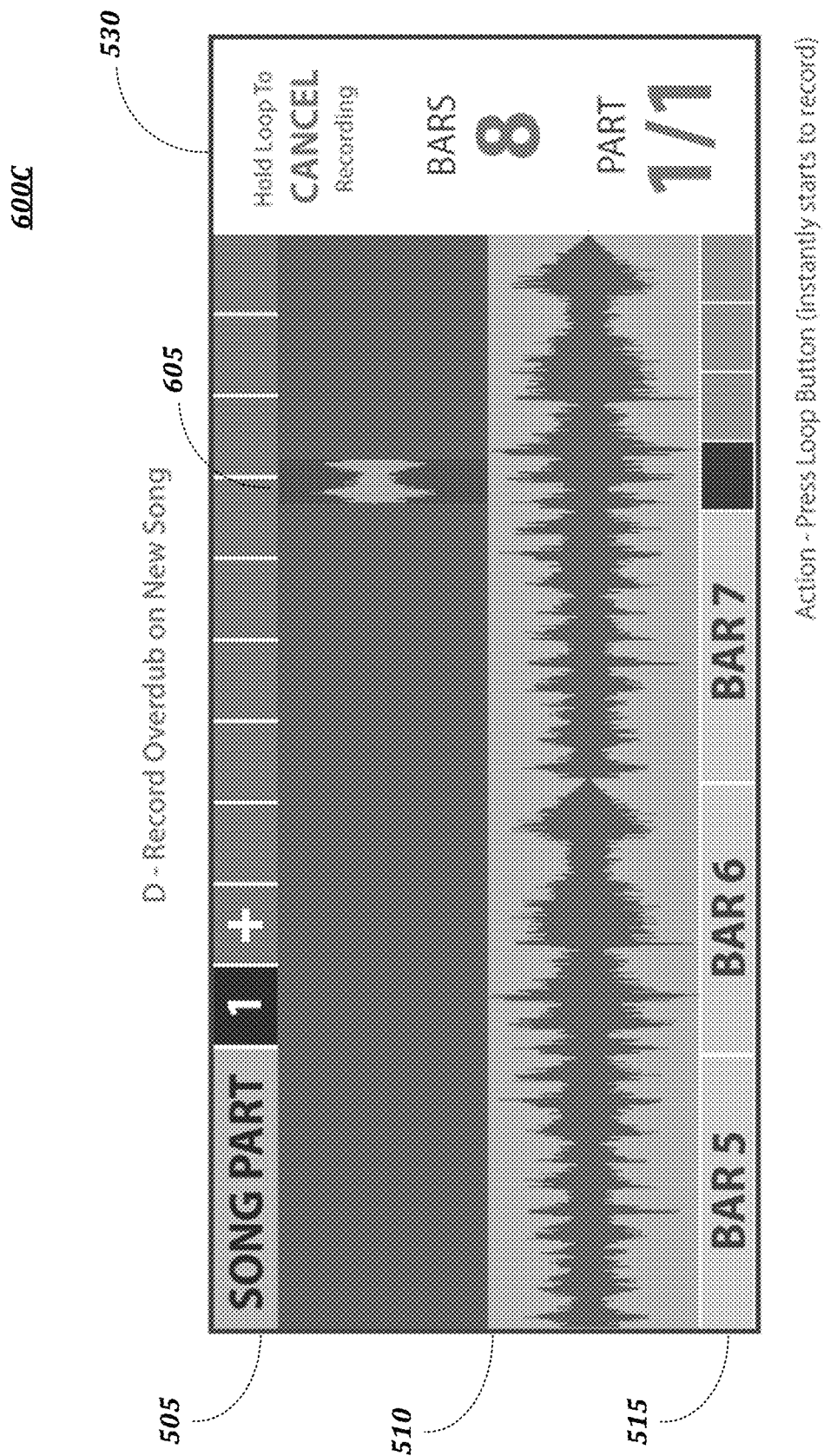

FIGS. 6A-6C illustrate embodiments of a user interface for looper 105. In general, interfaces 600A-600C may comprise a song part display 505 (e.g., an indicator as to which song part is being recorded), a waveform display 510—(e.g., a visual representation of recorded/played back waveform), a track display 515 (e.g., shows the progression of the tracks); and a details view 530 (e.g., displaying song part and track parameters).

FIG. 6A illustrates a user interface 600A depicting a Count In. FIG. 6B illustrates a user interface 600B depicting a capture recording. FIG. 6C illustrates a user interface 600C depicting a Record Overdub 605.

IV. Computing Device Architecture with an Apparatus

Figure 7:
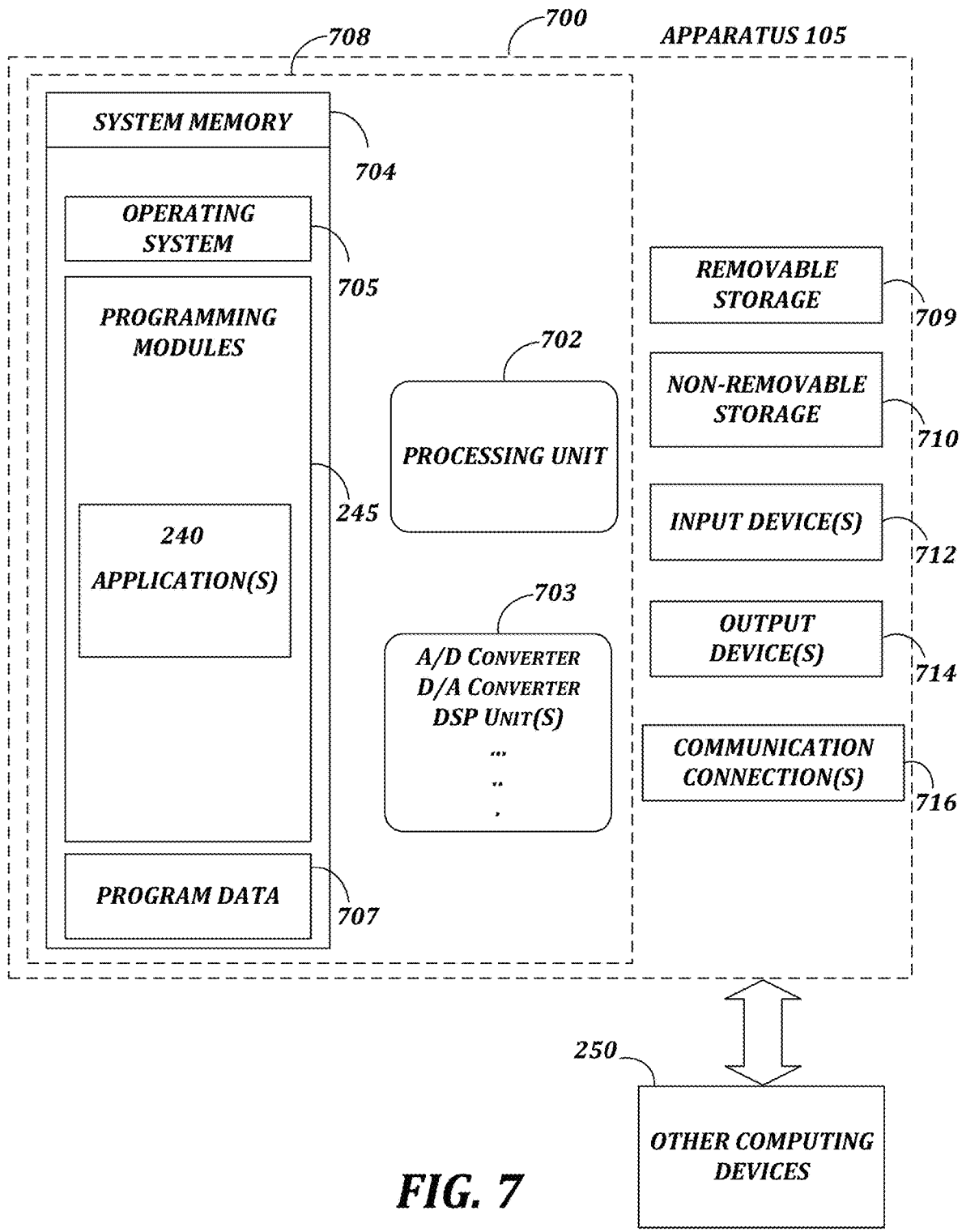
FIG. 7 is a block diagram of a computing device for recording and rendering multimedia.

FIG. 7 is a block diagram of a system including computing device 700. Computing device 700 may be embedded in an apparatus consistent with embodiments of the present disclosure. Furthermore, computing device 700 may be in operative communication with an apparatus consistent with embodiments of the present disclosure. One of ordinary skill in the field will recognize that computing device 700, or any portions thereof, may be implemented within any computing aspect in the embodiments disclosed herein (e.g., system 200). Moreover, computing device 700 may be implemented in or adapted to perform any method of the embodiments disclosed herein.

A memory storage and processing unit may be implemented in a computing device, such as computing device 700 of FIG. 7. Any suitable combination of hardware, software, or firmware may be used to implement the memory storage and processing unit. For example, the memory storage and processing unit may be implemented with computing device 700 or any of other computing device, such as, for example, but not limited to, device 100, device 200, and device 605, in combination with computing device 700. The aforementioned system, device, and processors are examples and other systems, devices, and processors may comprise the aforementioned memory storage and processing unit, consistent with embodiments of the disclosure.

With reference to FIG. 7, a system consistent with an embodiment of the disclosure may include a computing device, such as computing device 700. In a basic configuration, computing device 700 may include at least one processing unit 702 and a system memory 704. Additionally, computing device 700 may include signal processing components 703. Depending on the configuration and type of computing device, system memory 704 may comprise, but is not limited to, volatile (e.g. random access memory (RAM)), non-volatile (e.g. read-only memory (ROM)), flash memory, or any combination. System memory 704 may include operating system 705, one or more programming modules 706, and may include a program data 707. Operating system 705, for example, may be suitable for controlling computing device 700's operation. In one embodiment, programming modules 706 may include application 720. Furthermore, embodiments of the disclosure may be practiced in conjunction with a graphics library, other operating systems, or any other application program and is not limited to any particular application or system. This basic configuration is illustrated in FIG. 7 by those components within a dashed line 708.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by a removable storage 709 and a non-removable storage 710. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 712 such as a keyboard, a mouse, a pen, a sound input device, a touch input device, etc. Output device(s) 714 such as a display, speakers, a printer, etc. may also be included. The aforementioned devices are examples and others may be used.

Computing device 700 may also contain a communication connection 716 that may allow device 700 to communicate with other computing devices 718, such as over a network in a distributed computing environment, for example, an intranet or the Internet. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 704, including operating system 705. While executing on processing unit 702, programming modules 245 (e.g., applications 240) may perform processes including, for example, one or more of the stages as described below. The aforementioned process is an example, and processing unit 702 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and other quantum computing and storage elements. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), a carrier wave from the Internet, or other forms of RAM or ROM. Further, the disclosed methods' stages may be modified in any manner, including by reordering stages and/or inserting or deleting stages, without departing from the disclosure.

V. Multimedia Recording and Rendering

Figure 8:
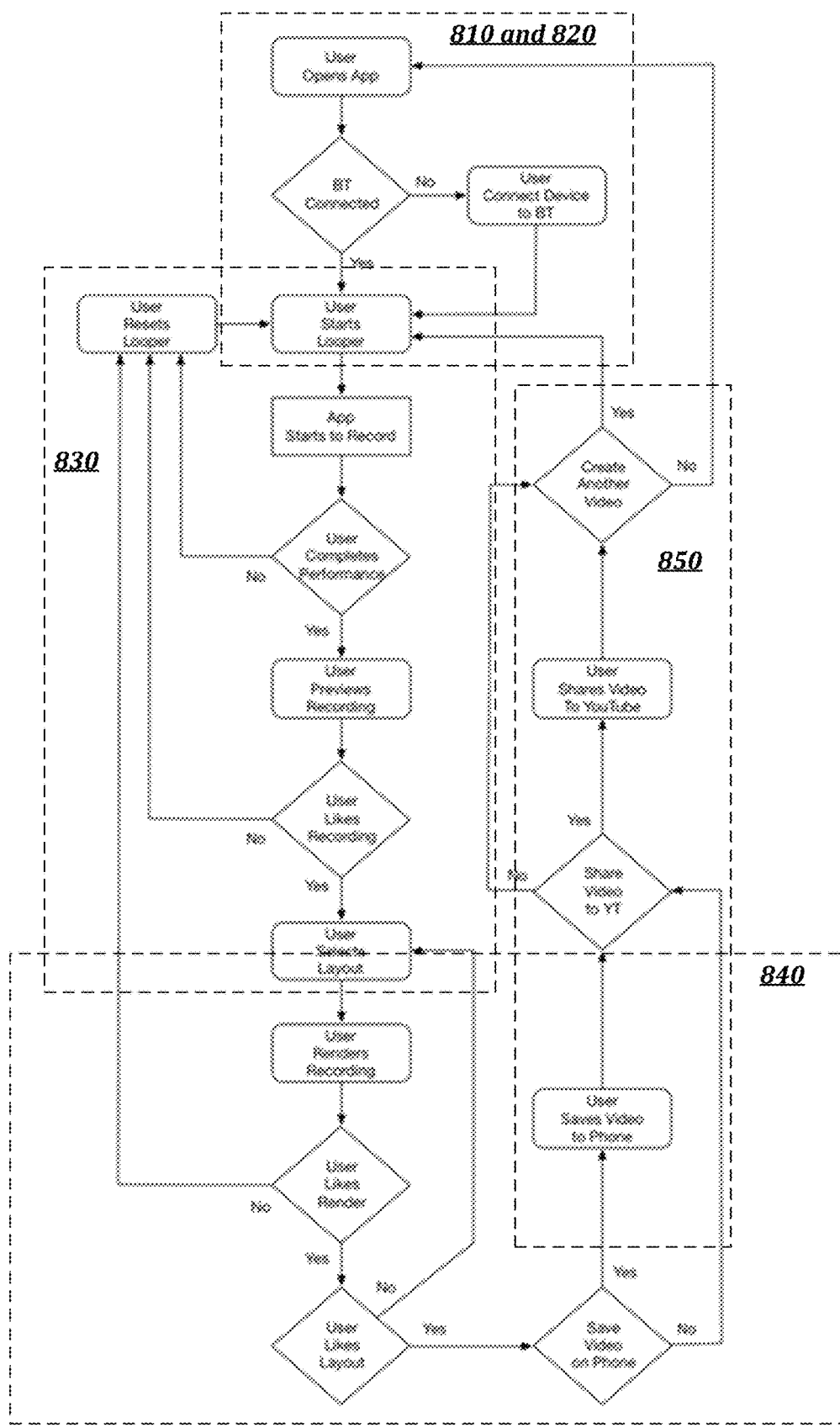
FIG. 8 is a flow chart for an embodiment of recording and rendering multimedia.

FIG. 8 is a flow chart setting forth the general stages involved in a method 800 consistent with an embodiment of the disclosure for providing recording and rendering multimedia. Method 800 may be implemented by any computing element in system 200 and in the context of an example embodiment which includes video and audio synchronization.

Example embodiments referenced throughout method 800. It is designed for a non-limiting, illustrative example of some functions features provided by system 200. In the example embodiments, looper 105 allows the user to record overdub loops (or tracks). The user can create up to six Song Parts each with their own set of background loops. A software application (an "app") working in conjunction with the looper records video of the user playing while using the Looper. The app may create separate scenes for each song part and creates on-screen overlays for the first three background recorded loops per song part. The app may play the video associated with an audio loop in a repeated looped fashion such that it is synced with the associated audio loop.

The app may capture and render the video such that the on-screen video overlays will change as the user changes song parts.

Although method 800 has been described to be performed by a computing element, the computing element may be referred to as computing device 700. It should be understood that the various stages in the system may be performed by the same or different computing device 700. For example, in some embodiments, different operations may be performed by different networked elements in operative communication with computing device 700. For example, looper 105, server 210, external devices 215, network loopers 230, data network 225, and connected devices 220 may be employed in the performance of some or all of the stages in method 800.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 800 will be described in greater detail below.

Figure 9A:
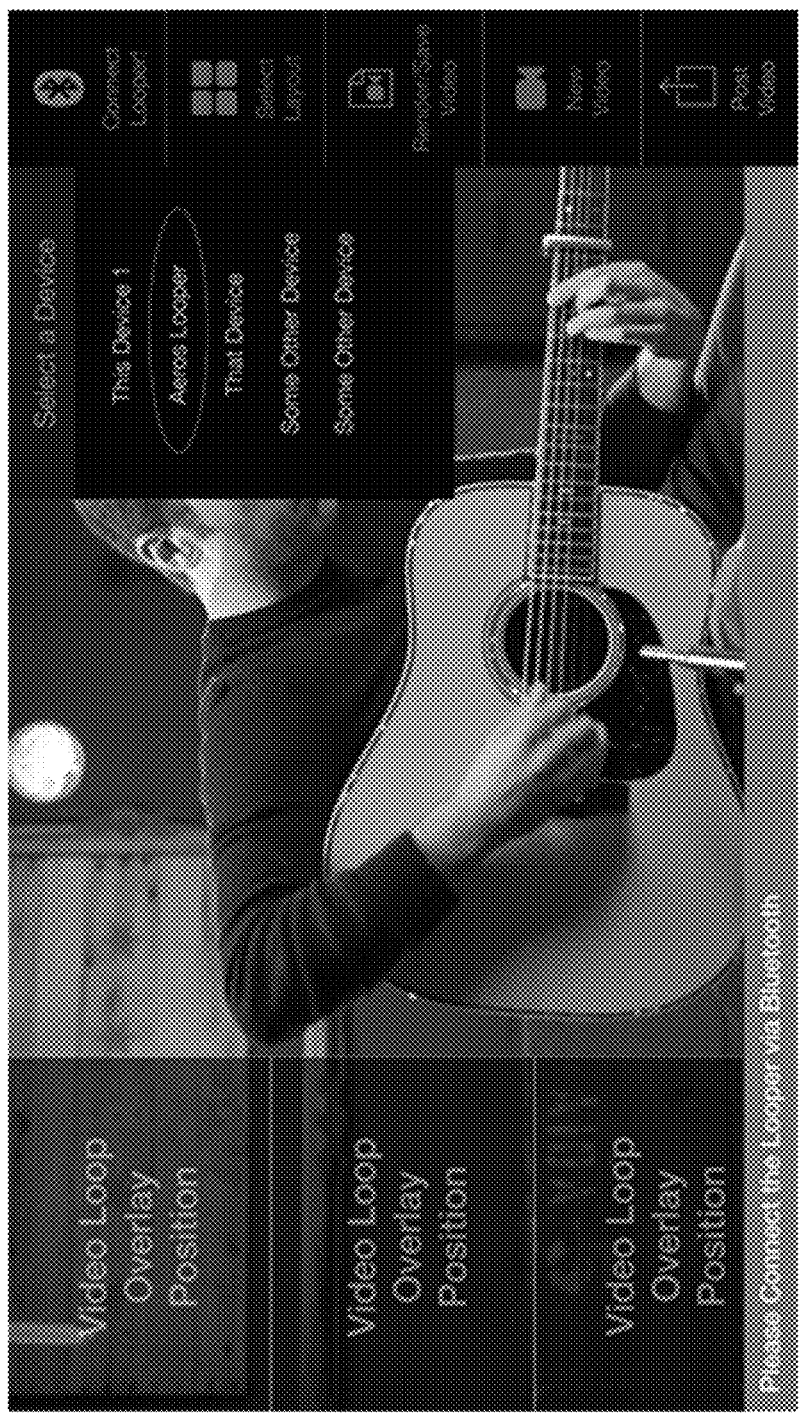
FIG. 9A-9D illustrate additional examples of a user interface for recording and rendering multimedia.

Method 800 may begin at starting block 805 and proceed to stage 810 where computing device 700 may a network communication may occur. For example, for the app to function, it's computing element (e.g., a smartphone or tablet) must be connected to, for example, looper 105 via Bluetooth. Referring now to FIG. 9A, stage 810 may comprise any one of the following substages:

a) The user may open the app on their computing element and see the live video feed on the screen with the main menu, overlay guides and message bar.
    b) The user may open the Bluetooth Device list by pressing the "Connect Looper!" button.
    c) The user may select a device from a list of available devices.
    d) The app may display a "Connecting . . . " dialog box.
    e) The app may display the Bluetooth Button with the Connected message.

Figure 9B:
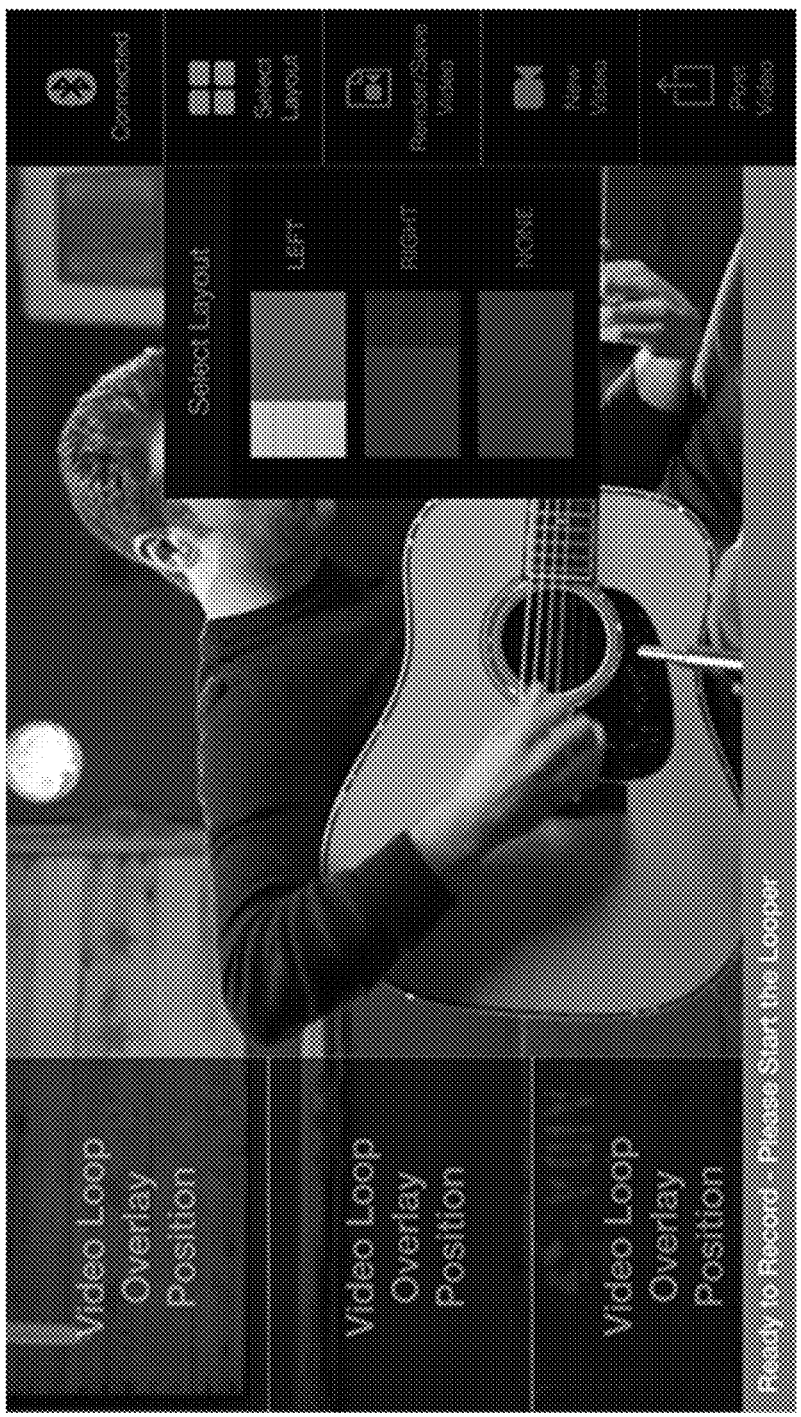
Figure 9C:
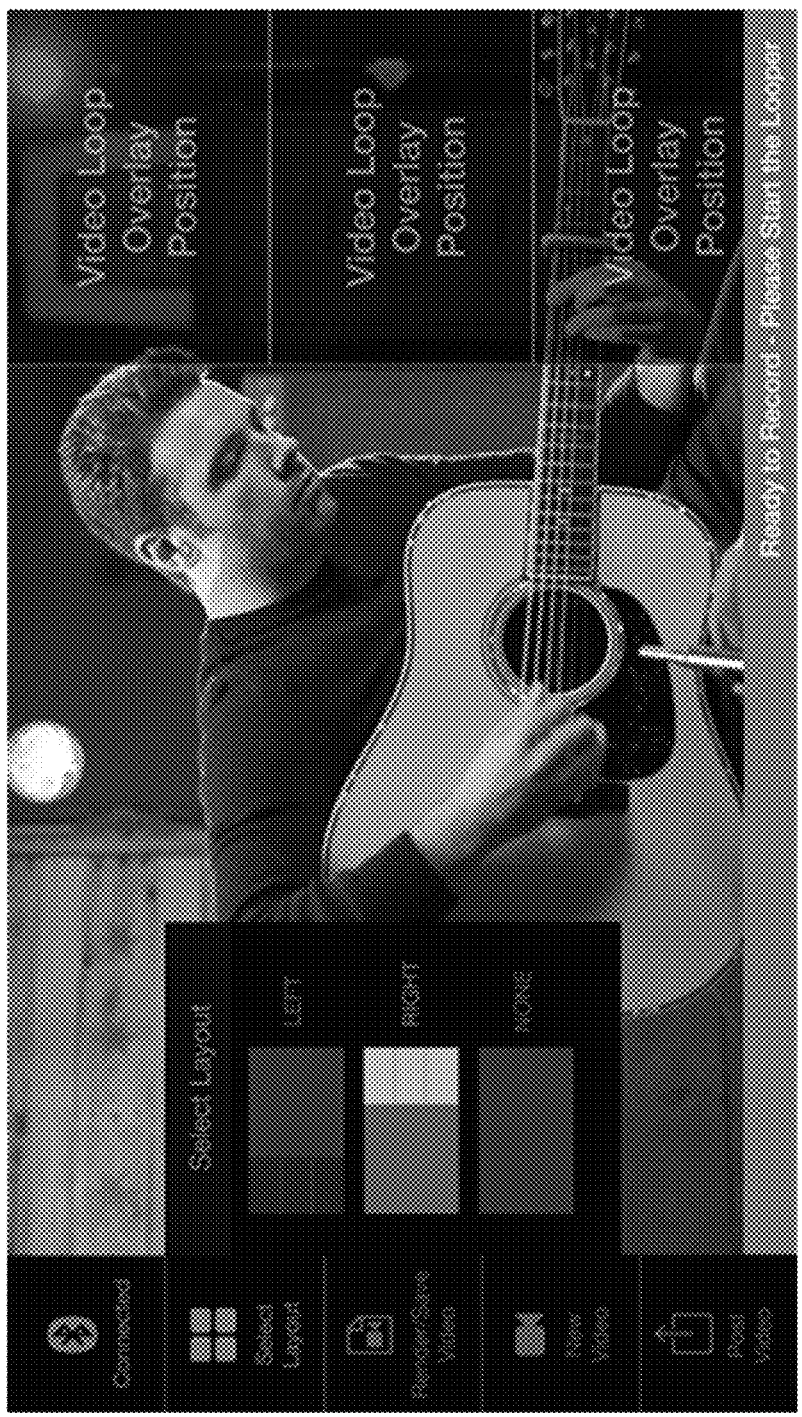

From stage 810, method 800 may advance to stage 820 where computing device 700 may receive a selection for a video layout. For example, referring to FIG. 9B and FIG. 9C, the user may select a layout that best fits their position on the screen by pressing the "Select Layout," such as, for example, a left aligned layout or a right aligned layout. In some embodiments, layouts may be selected and organized post-production.

It should be noted that the menus displayed in the referenced FIGS. 9A-9D may slide out of view during session activity. In some embodiments, the display may indicate the session activity in progress (e.g., that a video recording is in progress). Once the session activity has stopped, the menus may be redisplayed.

Method 800 may continue to stage 830 where computing device 700 may a commence a recordation session. See FIG. 9C. The trigger to begin the recordation session may be triggered by any computing element in system 200, such as for example, through a session activity on looper 105 (e.g., playback or recording). Similarly, the trigger to end a recordation session may also correspond to any session activity in system 200. As each track loops, so too may the recorded video segment loop. As each new track is recorded, an additional video segment is displayed concurrently with previously recorded videos that correspond to other tracks looping at a designated song part. In some embodiments, a user can preview each recorded track prior to accepting the track into a rendering.

Figure 9D:
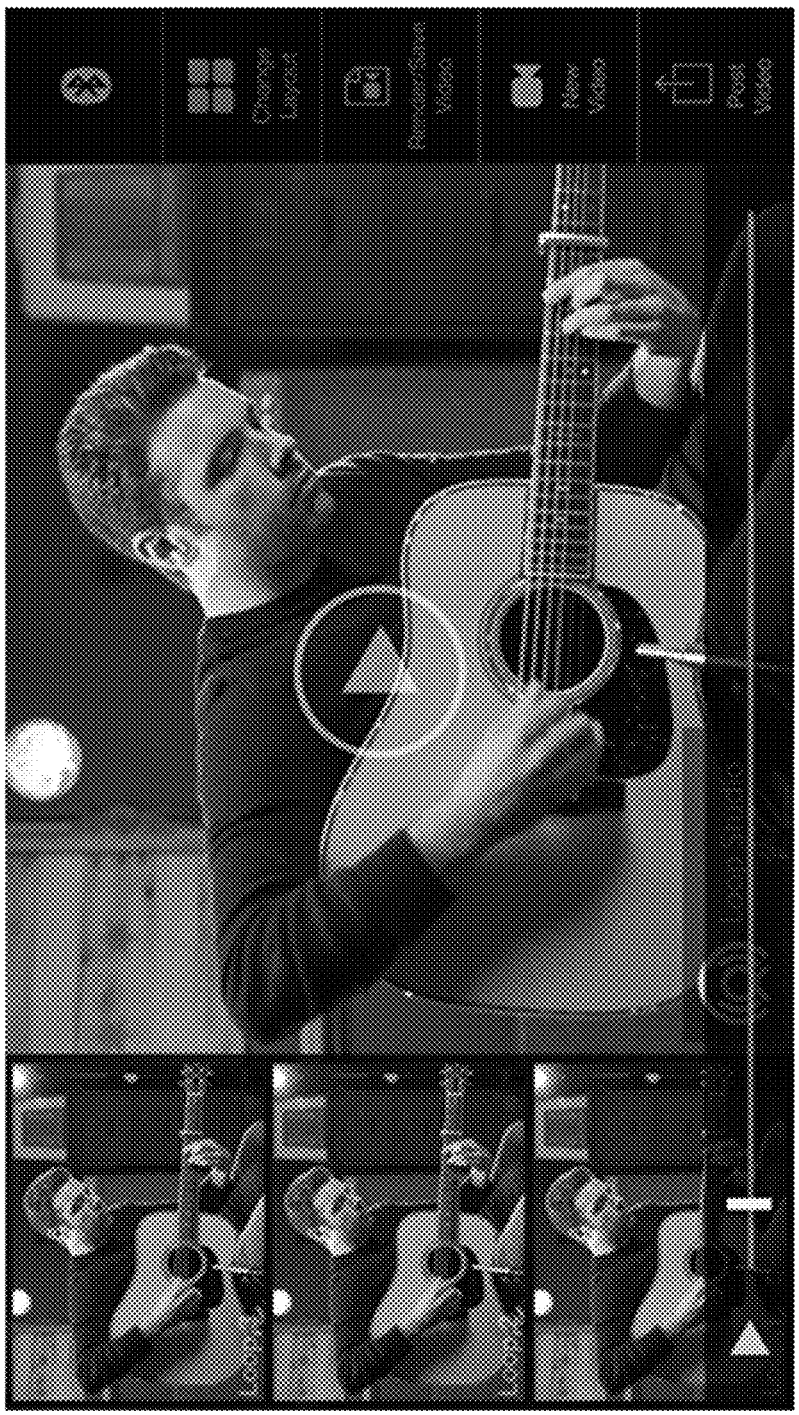

Method 800 may continue to stage 840 where computing device 700 may a commence a rendering of the recorded session. FIG. 9D illustrates an example of a rendered video. The app may display the rendered version of the video in the main viewing area after the render is complete. Stage 840 may comprise any one of the following substages or aspects:

a) The most recent Loop may be shown at the top.
    b) The "Render Videos to View Overlays" message may be removed when the video is being rendered and saved.
    c) The "Change Layout" option may not be available after rendering the video.
    d) The "Render/Save Video" option may not be available after rendering the video.
    e) The user may preview the video using the play transport.
    f) The menu slides out of view each time the video preview is started.
    g) The menu slides into view each time the video preview is stopped.
    h) The user can scrub to a new location in the video by dragging the playhead in the transport.
    i) The user can start and pause the video by pressing the anywhere on the video (as indicated with the play button on the screen).

After rendering the video in stage 840, method 800 may proceed to stage 850 where computing device 700 may publish the rendered video.

A. Audio Management

Still referring to the example in method 800, and consistent with some embodiments of the present disclosure, looper 105 may send the audio to the app when the recording is finished. The app may replace the audio that was captured by the phone with the audio that was sent from looper 105.

B. Video Management

Still referring to the example in method 800, and consistent with some embodiments of the present disclosure, the App may capture the video as one file. The App may log and save the following information (sent from Looper 105) for use during the rendering process:
    Song Part Associated with each loop
    Index Number of each loop (loop1, loop2, etc.)
    Start and stop time of each loop
    Start and stop time of each Song Part
    Furthermore, in some embodiments, the App may use at least one of the following stages to create the Rendered Video:
    1. Record the performance and log the control data that is sent from looper 105.
    2. Receive the audio file from the looper 105 (when the performance is complete).
    3. Replace the phone audio with the looper audio for use in the video file.
    4. Create files of the video loop/overlays and name them with the associated index (SP1L1, SP1L2, SP2L1, etc.) where SP is the song part number and L is the loop number (track) in the Song Part).
    5. Render the video, displaying the loop/overlays in the correct position and at the correct time.

In some embodiments, there may be two methods required to tag and track the video loops. The first method is to tag and track the start and end of each loop. This method is used to render the overlay of the video. The second method is to track which loops overlays are displayed at a given time in the video. This may take into account that loops can be undone or muted after they are recorded.

Furthermore, in some embodiments, it is suggested that each time a loop is undone or muted that the internal Timeline Tracking Model (database, JSON, etc.) write the list of what is displayed, instead of tracking undo/redos and mutes/unmutes. This method is demonstrated in the following example.

i. Example of Writing to the Loop Timeline Tracking Model (TTM)
Capture SP1L1—(DB Record 1, VRT1, SP1L1)
Capture SP1L2—(DB Record 2, VRT2, SP1L1, SP1L2)
Capture SP1L3—(DB Record 3, VRT3, SP1L1, SP1L2, SP1L3)
Undo—(DB Record 4, VRT4, SP1L1, SP1L2)
Redo—(DB Record 5, VRT5, SP1L1, SP1L2, SP1L3)
Mute SP1L2—(DB Record 6, VRT6, SP1L1, SP1L3)
Unmute SP1L2—(DB Record 7, VRT7, SP1L1, SP1L2, SP1L3)
Capture SP2L1—(DB Record 8, VRT8, SP2L1)
Play SP1—(DB Record 9, VRT9, SP1L1, SP1L2, SP1L3)
Play SP2—(DB Record 10, VRT10, SP2L1) looper 105

C. Hardware Communication Protocol

Still referring to the example in method 800, and consistent with some embodiments of the present disclosure, the following commands may be used for the app to communicate with looper 105.
SongStart
LoopStart
LoopEnd
UndoRedo
MuteLoop
UnmuteLoop
SongStop
GetAudio i. SongStart In some embodiments, the SongStart command may sent from looper 105 to the app when the song is started on the device. This command may not have any parameters.

In some embodiments, the app may send a "Success" or "Fail" response. If the app sends a "Success" response, the device may continue to record. If the app sends a "Fail" response the device may stop the recording and show an error message, such as, "Error Communicating with the Video App. Please clear the song and restart the recording process."

ii. LoopStart

In some embodiments, the LoopStart command may be sent from the device to the app when the actual recording of a loop is started on the device. The LoopStart command may have at least one the following parameters:
SongPartNumber (integer)—The index of the current song
LoopNumber (integer)—The index number of the loop within the current song part
a) Example Command: Loop 3 in Song Part 2
LoopStart (2,3)
Response: The app will send with "Success" or "Fail" response with parameters echoed back. If the app sends a "Success" response, the device will continue to record. If the app sends a "Fail" response or sends the incorrect parameter echo, then the device will stop the recording and show the following message "Error Communicating with the Video App. Please clear the song and restart the recording process."
b) Example Response: Loop 3 in Song Part 2
Success (2,3)
Fail (2,3)

iii. LoopEnd

In some embodiments, the LoopEnd command may sent from the device to the app when the actual recording of a loop is captured on the device (at End of Measure, not when the device button is pressed). The LoopEnd command may not have parameters.

In some embodiments, the app will send a "Success" or "Fail" response. If the app sends a "Success" response, the device may continue to play. If the app sends a "Fail" response the device may stop the song and show an error message, such as, "Error Communicating with the Video App. Please clear the song and restart the recording process."

iv. UndoRedo

In some embodiments, the Undo command requires that the app keep track of the following loop states.

Case 1—First SP, the most recent Loop is currently recording (LoopStart without a subsequent LoopEnd). In this case, the loop recording was canceled on the device and the app should remove the LooperStart tag from the video timeline model (database, JSON, etc.).

Case 2—First SP, the most recent Loop was completed (LoopStart/LoopEnd pair successfully sent). In this case the most recent loop is removed. Since an Undo can be undone (via a Redo) the app will send a DB Record to the Timeline Tracking Model (TTM). The app will set an Undo flag to false to know that the next UndoRedo command will be a Redo.

Case 3—First SP, the most recent Loop was completed & Song Part did not change & Undo flag set to false. In this case, the most recent loop is added back. Since a Redo can be undone (via an Undo) the app will send a DB Record to the Timeline Tracking Model (TTM). The app will set the Undo flag to true to know that the next Undo/Redo command will be an Undo.

Case 4—First SP, the most recent Loop was completed & Song Part did not change & Undo flag set to true. In this case, the most recent loop is added back. Since a Redo can be undone (via an Undo) the app will send a DB Record to the Timeline Tracking Model (TTM). The app will set the Undo flag to true to know that the next Undo/Redo command will be an Undo.

Case 5—Next SP, the most recent Loop is currently recording (LoopStart without a subsequent LoopEnd). This is the same as Case 1. The Undo flag is set to true when the Song Part changes.

Case 6—Next SP, Most Recent Loop was Completed (Song Part changed). This is the same as Case 2. The Undo flag is set to true when the Song Part changes.

The app may send with "Success" or "Fail" response. If the app sends a "Success" response, the device may do nothing. If the app sends a "Fail" response the device will send the CancelLoop command again. The device will send the CancelLoop command a max of three times.

v. SongStop

In some embodiments, the SongStop command may be sent from the device to the app when the song is stopped on the device. This command may not have any parameters. This command may not have a response.

vi. GetAudio

In some embodiments, the GetAudio command may be sent from the app to the device to request the entire get the entire audio of the performance. This command may have at least one of the following parameters:

AudioQuality (way or mp3)—This specifies the audio quality of the file that is sent from the device to the app.
 a) Example Command: Loop 3 in Song Part 2
 GetAudio (way)
 GetAudio (mp3)

This command may not have a response. The app may use the BTLE packet error checking to ensure that the packet is received properly. If there is an error in the receiving the packet, the app may display the following message: "There was an error receiving the audio file. Please try again."

VI. Collaboration Module Operation

A collaboration module may be configured to share data between a plurality of nodes in a network. The nodes may comprise, but not be limited to, for example, an apparatus consistent with embodiments of the present disclosure. The sharing of data may be bi-directional data sharing, and may include, but not be limited to, audio data (e.g., song parts, song tracks) as well as metadata (e.g., configuration data associated with the audio data) associated with the audio data.

Still consistent with embodiments of the present disclosure, the collaboration module may be enabled to ensure synchronized performances between a plurality of nodes. For example, a plurality of nodes in a local area (e.g., a performance stage) may all be interconnected for the synchronization of audio data and corresponding configuration data used to arrange, playback, record, and share the audio data.

In some embodiments of the present disclosure, any networked node may be configured to control the configuration data (e.g., playback/arrangement data) of the tracks being captured, played back, looped, and arranged at any other node. For example, one user of a networked node may be enabled to engage performance mode and the other networked nodes may be configured to receive such indication and be operated accordingly. As another example, one user of a networked node can initiate a transition to a subsequent song part within a song and all other networked nodes may be configured to transition to the corresponding song-part simultaneously. As yet another example, if one networked node records an extended over-dub, then the corresponding song part on all networked nodes may be similarly extended to ensure synchronization. In this way, other functions of each networked node may be synchronized across all networked nodes (e.g., play, stop, loop, etc.)

By way of further non-limiting example, the synchronization may ensure that when one node extends a length of a song part, such extension data may be communicated to other nodes and cause a corresponding extension of song parts playing back on other nodes. In this way, the playback on all nodes remains synchronized. Accordingly, each node may be configured to import and export audio data and configuration data associated with the audio data as needed, so as to add/remove/modify various songs, song parts, and song layers of song parts.

Furthermore, in accordance to the various embodiments herein, the collaboration module may enable a first user of a first node to request additional layers for a song part. A second user of a second node may accept the request and add an additional layer to the song part. The updated song part, comprised of the audio data and configuration data, may then be communicated back to the first node. In some embodiments, the second node may extend the length of the song part (see recordation module details) and return updated audio data and configuration data for all song layers. The updated data may include datasets used by a display module to provide visual cues associated with the updated data (e.g., transition points between song parts).

The collaboration module may further be configured to send songs, song parts, song layers, and their corresponding configuration data to a centralized location accessible to a plurality of other nodes. The shared data can be embodied as, for example, a request for other nodes to add/remove/modify layers and data associated with the shared data. In some embodiments, the centralized location may comprise a social media platform, while in other embodiments, the centralized location may reside in a cloud computing environment.

Further still, embodiments of the present disclosure may track each nodes access to shared audio data as well as store metadata associated with the access. For example, access data may include an identify of each node, a location of each node, as well as other configuration data associated with each node.

VII. Aspects

While the specification has been described in language specific to structural features and/or methodological acts, the aspects are not limited to the features or acts described above. Rather, the specific features and acts described above are disclosed as example for embodiments of the disclosure.

Insofar as the description above and the accompanying drawing disclose any additional subject matter that is not within the scope of the aspects below, the disclosures are not dedicated to the public and the right to file one or more applications to claims such additional disclosures is reserved.

Although very narrow aspects are presented herein, it should be recognized the scope of this disclosure is much broader than presented by the aspects. It is intended that broader aspects will be submitted in an application that claims the benefit of priority from this application.

The aspects break down the invention into computing modules, used for illustrative, non-limiting purposes.

1. A computer readable medium comprising, but not limited to, at least one of the following:
 a. An input module;
 b. A display module;
 c. An arrangement module;
 d. A playback module;
 e. A recording module;
 f. A video controller module; and
 g. A collaboration module.

Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage in the disclosed language can be considered independently without the context of the other stages. Each stage may contain language defined in other portions of this specifications. Each stage disclosed for one module may be mixed with the operational stages of another module. Each stage can be claimed on its own and/or interchangeably with other stages of other modules.

The following aspects will detail the operation of each module, and inter-operation between modules. The hardware components that may be used at the various stages of operations follow the method aspects.

Figure 2B:
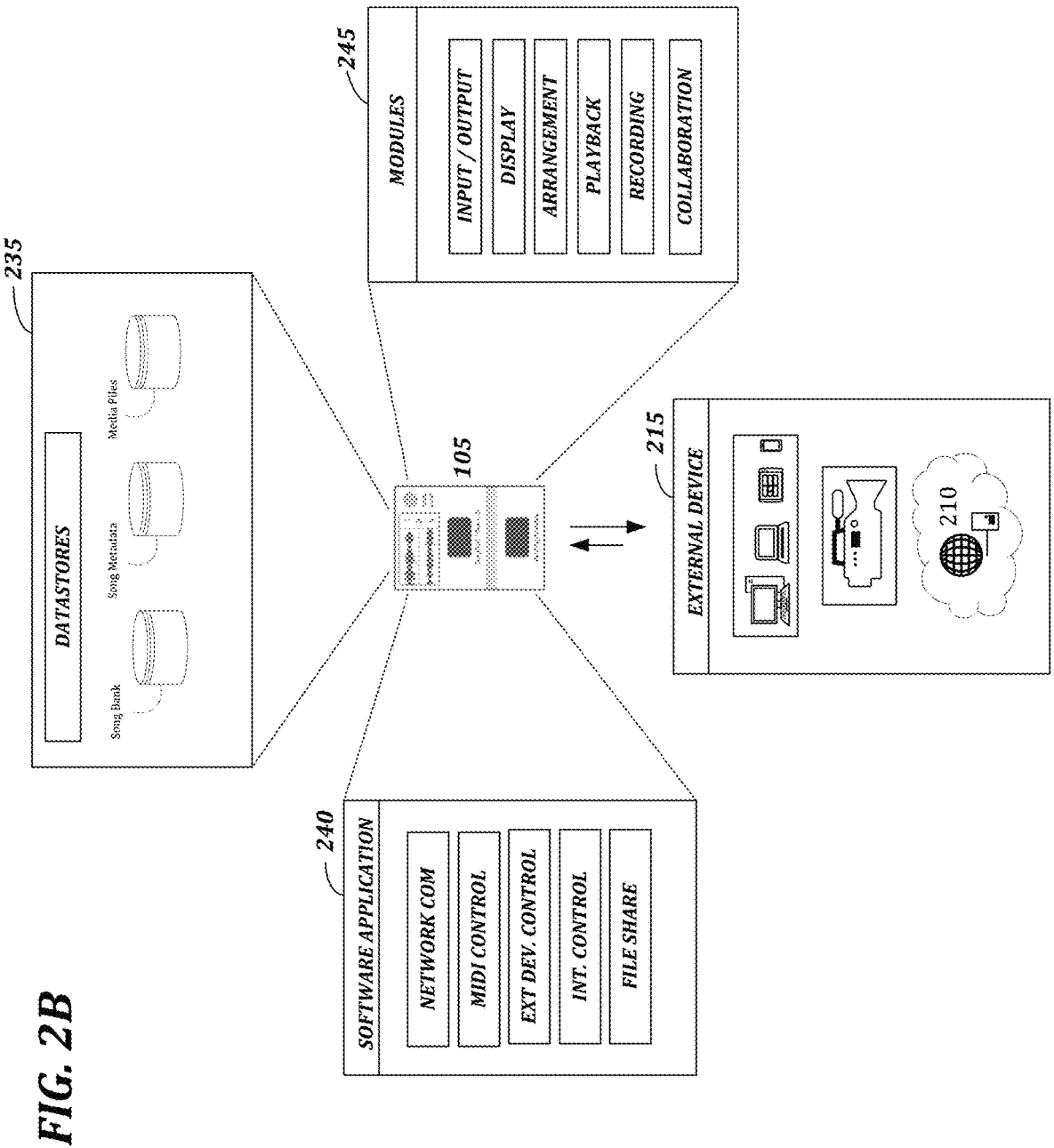

The methods and computer-readable media may comprise a set of instructions which when executed are configured to enable a method for inter-operating at least the modules illustrated in FIGS. 2A and 2B. The aforementioned modules may be inter-operated to perform a method comprising the following stages. The aspects disclosed under this section provide examples of non-limiting foundational elements for enabling an apparatus consistent with embodiments of the present disclosure.

Although the method stages may be configured to be performed by computing device 700, computing device 700 may be integrated into any computing element in system 200, including looper 105, external devices 215, and server 210. Moreover, it should be understood that, in some embodiments, different method stages may be performed by different system elements in system 200. For example, looper 105, external devices 215, and server 210 may be employed in the performance of some or all of the stages in method stages disclosed herein.

Furthermore, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated.

Finally, the aspects are not structured in the same way non-provisional claims are structured. For example, indentations indicate optional/dependent elements of a parent element.

Independent Stage I
Optional Stage 1
  Optional Sub-Stage A
  Optional Sub-Stage B
Optional Stage 2
  Optional Sub-Stage A
  Optional Sub-Stage B
  Optional Sub-Stage C
    Optional Child Element i The aforementioned elements may be mixed a matched from one embodiment to another to provided any functionality disclosed herein.

A method for operating the computer readable medium of aspect 1, the method comprising any one of the following modules:
 a. An input module;
 b. A display module;
 c. An arrangement module;
 d. A playback module;
 e. A recording module;
 f. A video controller module; and
 g. A collaboration module.

A. Input Module

A First Set of Embodiments for Receiving at Least One Input Signal Comprising at Least One of the Following Stages receive a signal from at least one input;
 wherein the at least one input corresponds to at least one of the following:
  an input from a wired medium, and
  an input from a wireless medium;
 wherein the signal corresponds to at least one of the following:
  an analog audio signal,
  a digital audio signal,
  a MIDI signal,
  a data signal from an external computing device; and
   converting the received signal to recorded data.

A Second Set of Embodiments for Receiving at Least One Input Signal Comprising at Least One of the Following Stages wherein the recorded data corresponds to at least one of the following:
 at least one track corresponding to at least one of:
  a recorded audio track,
  a processed audio track, and
  a recorded MIDI track;
 a waveform associated with each audio track,
  wherein the waveform is one of:
   comprised within the recorded data, and
   generated based upon the recorded data;
 a MIDI map associated with each MIDI track, and
 a visual representation corresponding to:
  the waveform, and
  the MIDI map,
   wherein the visual representation is one of:
    comprised within the recorded data, and
    generated based upon the recorded data.

A Third Set of Embodiments for Receiving at Least One Signal Input Comprising at Least One of the Following Stages wherein the recorded data further comprises configuration data,
wherein the configuration data comprise at least one of the following:
 at least one arrangement parameter,
 at least one playback parameter, and
 a display parameter, and
wherein the configuration data are employed by at least one of the following:
 an arrangement module configured to arrange the at least one track associated with the recorded data based at least in part on the at least one arrangement parameter, a playback module configured to playback the at least one track associated with the recorded data based at least in part on the at least one playback parameter, and a display module configured to display the visual representation associated with the at least one track based at least in part on the at least one display parameter.

A First Set of Embodiments for Receiving External Data Comprising at Least One of the Following Stages receive data from an external computing device and/or musical instrument;
 wherein the received data corresponds to at least one of the following:
  at least one track corresponding to at least one of:
   a sampled audio track,
   a processed audio track, and
   a MIDI track;
  a waveform associated with each audio track,
   wherein the waveform is one of:
    comprised within the received data, and
    generated based upon the received data;
  a MIDI map associated with each MIDI track, and
  a visual representation corresponding to:
   the waveform, and
   the MIDI map, wherein the visual representation is one of:
comprised within the received data, and
generated based upon the received data.

A Second Set of Embodiments for Receiving
External Data Comprising at Least One of the
Following Stages wherein the received data further comprises configuration data,
wherein the configuration data comprise at least one of the following:
  at least one arrangement parameter,
  at least one playback parameter, and
  a display parameter,
wherein the configuration data are employed by at least one of the following:
  an arrangement module configured to arrange the at least one track associated with the received data based at least in part on the at least one arrangement parameter,
  a playback module configured to playback the at least one track associated with the received data based at least in part on the at least one playback parameter, and
  a display module configured to display the visual representation associated with the at least one track based at least in part on the at least one display parameter; and
wherein setting the configuration data comprises receiving a configuration value from a user selectable control,
  wherein the user selectable control is configured to set the at least one playback parameter, and
    wherein the user selectable control is configured remotely, and
    wherein the user selectable control is configured to be a foot-operable control.
B. Display Module A First Set of Embodiments Comprising at Least
One of the Following Stages Generate at least one graphical element and at least one textual element based on audio data,
  wherein the audio data is associated with:
    an audio waveform configured for playback,
    a visual representation corresponding to the audio waveform configured for visual display, and
    at least one configuration parameter for the audio waveform,
  wherein the configuration parameter is structured to indicate an association of the audio track with at least one of the following:
    a song part,
    a track within the song part,
    a layer within a track,
    at least one playback parameter,
    at least one arrangement parameter, and
    at least one display parameter.
  wherein the audio data is further associated with:
    at least one track corresponding to at least one of:
      a recorded audio track,
      a processed audio track, and
      a recorded MIDI track;
    a waveform associated with each audio track,
      wherein the waveform is one of:
        comprised within the recorded data, and
        generated based upon the recorded data;
    a MIDI map associated with each MIDI track, and
    a visual representation corresponding to:
      the waveform, and
      the MIDI map,
        wherein the visual representation is one of:
          comprised within the recorded data, and
          generated based upon the recorded data.
  wherein the audio data is further associated with:
    visual indicators associated with song performance, including, but not limited to:
      a starting point,
      a stopping point,
      a quantity of loop cycles,
      a measure of playback,
      a tempo of playback,
      a transition point,
      a recording indication,
      an overdub indication,
      a playback indication, and
      instructions for operation;
  organize the generated at least one graphical representation and at least one textual representation into visual segments,
    wherein the visual segments correspond to at least one of the following:
      a song,
      a song part, and
      a track within a song part,
  cause a display of the at least one graphical representation and at least one textual representation,
    wherein displaying comprises at least one of the following:
      a display unit, and
      a communications module operative to enable the display to occur remotely from the display unit.
C. Arrangement Module A First Set of Embodiments for Accessing the Data
Comprising at Least One of the Following Stages access a plurality of tracks and data corresponding to each of the tracks;
  wherein accessing the plurality of tracks comprises receiving the plurality of tracks from at least one of the following:
    the input module,
    the recording module,
    the playback module, and
    the collaboration module;

A Second Set of Embodiments for Determining an
Arrangement of the Data Comprising at Least One
of the Following Stages determine an arrangement for each track of the plurality of tracks in a song, wherein determining the arrangement comprises at least one of the following:
  reading the data associated with each track, wherein the data comprises configuration data for each track's arrangement within a song part,
  setting at least one arrangement parameter corresponding to the arrangement of each track within the song part, wherein the at least one arrangement parameter corresponding to the arrangement of the track specifies, at least, at least one song part associated with the track,
   wherein a track may be duplicated across multiple song parts,
      wherein a modification of the track in one song part causes a modification of the duplicated track in another song part,
setting at least one additional arrangement parameter corresponding to a playback position of a song part,
   wherein the at least one additional arrangement parameter corresponding to the arrangement to the song part determines, at least, a playback position of the song part within the song,
wherein setting the configuration data comprises receiving a configuration value from a user selectable control.
   wherein the user selectable control is configured to set the at least one playback parameter, and
      wherein the user selectable control is configured remotely, and
      wherein the user selectable control is configured to be a foot-operable control,
wherein each song part is configured to contain a plurality of parallel layers of tracks and data,
wherein the arrangement of each track within each song part is determined, at least in part, by the at least one arrangement parameter associated with each track,
wherein the arrangement of each song part is determined, at least in part, by the at least one additional arrangement parameter corresponding to the playback position of the song part, and A Third Set of Embodiments for Arranging the Data Comprising at Least One of the Following Stages arrange the plurality of tracks into the song,
   wherein the song is comprised of at least one track and at least one song part,
   wherein an arrangement of the song comprises at least one of the following:
      at least one song part comprised of a segment of parallel tracks arranged for concurrent playback, and
      a series of song parts, wherein a first segment of parallel tracks arranged in a first song part is configured for playback before a second segment of parallel tracks arranged in a subsequent song part,
   wherein determining the arrangement of track layers within each song part employs, at least in part, the at least one arrangement parameter specifying to at least one song part associated with each track, and
   wherein determining the arrangement of song parts within the song employs the at least one additional arrangement parameter specifies a playback position of each song part within a series of song parts.

A Fourth Set of Embodiments for Rearranging the Data Comprising at Least One of the Following Stages rearrange at least one of the plurality of tracks,
   wherein a rearrangement comprises at least one of the following:
      modifying the series of song parts by changing a playback position of a first segment of parallel tracks relative to a second segment of parallel tracks, and
      modifying an individual segment of parallel tracks by at least one of the following:
         removing a track layer,
         adding a track layer,
         editing a track layer, and
         moving a track layer from the first segment to the second segment, and
update arrangement data corresponding to the rearrangement,
   wherein updating the arrangement data comprises at least one of the following:
      updating the at least one arrangement parameter corresponding to each track modified, and
      updating the at least one additional arrangement parameter corresponding to each song part modified.

A Fifth Set of Embodiments for Aligning for Playback Comprising at Least One of the Following Stages arrange the plurality of tracks into the song,
   wherein the song is comprised of at least one track and at least one song part,
   wherein an arrangement of the song comprises at least one of the following:
      at least one song part comprised of a segment of parallel tracks arranged for concurrent playback, and
      a series of song parts, wherein a first segment of parallel tracks arranged in a first song part is configured for playback before a second segment of parallel tracks arranged in a subsequent song part,
aligning the plurality of parallel tracks arranged for concurrent playback,
   wherein aligning the plurality of parallel tracks comprises:
      reading an audio marker embedded in the audio data,
         wherein the audio marker comprises an audio pulse followed by a dithered space of silence,
            wherein the audio pulse is inserted into the beginning of a track associated with the audio data, and
            wherein the audio pulse is inserted at the beginning of PCM and/or MP3 files and is used to align encoded or transported versions of the audio data, and
      aligning each of the parallel tracks by aligning, in time and position, the audio marker in each of the parallel tracks.
   The aforementioned may be provided for syncing purposes. PCM files by nature have a variable amount of dead space in the beginning which makes syncing them by aligning the beginnings of the files to each other impossible. This pulse, follow by a set amount of silence allows the alignment to happen because the amount of silence following the pulse is always the same.

D. Playback Module

A First Set of Embodiments for Accessing the Data Comprising at Least One of the Following Stages access a plurality of tracks and data corresponding to each of the tracks;
  wherein accessing the plurality of tracks comprises receiving the plurality of tracks from at least one of the following:
    the input module,
    the recording module,
    the playback module, and
    the collaboration module;

A Second Set of Embodiments for Determining an Arrangement Comprising at Least One of the Following Stages determine an arrangement for each track of the plurality of tracks in a song,
  wherein determining the arrangement comprises at least one of the following:
    reading the data associated with each track, wherein the data comprises configuration data for each track's arrangement within a song part,
    setting at least one arrangement parameter corresponding to the arrangement of each track within the song part,
      wherein the at least one arrangement parameter corresponding to the arrangement of the track specifies, at least, at least one song part associated with the track,
        wherein a track may be duplicated across multiple song parts,
        wherein a modification of the track in one song part causes a modification of the duplicated track in another song part,
    setting at least one additional arrangement parameter corresponding to a playback position of a song part,
      wherein the at least one additional arrangement parameter corresponding to the arrangement to the song part determines, at least, a playback position of the song part within the song,
    wherein setting the configuration data comprises receiving a configuration value from a user selectable control.
      wherein the user selectable control is configured to set the at least one playback parameter, and
      wherein the user selectable control is configured remotely, and
      wherein the user selectable control is configured to be a foot-operable control,
  wherein each song part is configured to contain a plurality of parallel tracks of tracks and data,
  wherein the arrangement of each track within each song part is determined, at least in part, by the at least one arrangement parameter associated with each track,
  wherein the arrangement of each song part is determined, at least in part, by the at least one additional arrangement parameter corresponding to the playback position of the song part, A Third Set of Embodiments for Determining a Playback Type Comprising at Least One of the Following Stages receive an instruction to playback at least a portion of the song,
  wherein the instruction comprises at least one of the following:
    Straight-Through Playback
    a straight-through playback command, wherein the straight-through playback command comprises:
      a starting point,
        wherein the starting point is associated with at least one of the following:
        a user selected position,
        a position of a previous playback termination, and
        the beginning of a song part corresponding to at least one of the following:
        the user selected position, and
        the position of the previous playback termination,
      an ending point,
        wherein the ending point is defined to be at least one of the following:
        an end of the last song part of the song,
        a current playback location upon the receipt a stop playback command,
      wherein the straight-through command causes a sequential playback of each song part between the starting point and the ending point, in a corresponding playback sequence for each song part,
    Looped Playback
    a looped playback command, wherein looped playback command comprises at least one of the following:
      a loop starting point,
      a loop ending point,
      at least one song part to be looped, and
      a quantity of cycles to playback a loop,
      wherein the loop starting point and the loop ending point is configured to comprise a plurality of song parts within the loop starting point and the loop ending point,
        wherein each song part may have a different quantity of loop cycles before a transition to the subsequent song part, A Fourth Set of Embodiments for Transitioning Between Playback Types Comprising at Least One of the Following Stages Embodiment 1 continuing playback until at least one of the following events occurs:
  a termination command is received to terminate playback, and
  a number of loops to playback expires for each song part, and
  the last song part has been played through and no further loop playbacks have been instructed.

Embodiment 2 receiving the loop playback command during a straight-through playback, and
looping a song part being played back during the receipt of the loop playback command,

Embodiment 3 receiving a straight-through playback command during a loop playback, and
sequentially playing back each song part subsequent to the song part being played back during the receipt of the straight-through playback command,

A Fifth Set of Embodiments for Transitioning Between Song Parts Comprising at Least One of the Following Stages receiving a transition command during a playback of a song part, and transitioning to a different song part within the song,
   wherein the different song part is determined based at least in part on of the following:
      a song part in subsequent playback position,
         wherein the subsequent playback position is set by the configuration data associated with the song the song part, and the tracks therein,
      a song part associated with a state of a selectable control that triggered the transition command,
         wherein the user selectable control is configured remotely, and
         wherein the selectable control is a foot-operable control,
      wherein the selectable control may comprise multiple states corresponding to different user engagement types with the selectable control,
         wherein each state is associated with a playback position, and
      wherein triggering a state corresponds to the transition of playback to a song part corresponding to the playback position.

A Sixth Set of Embodiments for Configuring Playback Data Comprising at Least One of the Following Stages determine at least one playback parameter for at least one of the following:
   a song,
   a song part, and
   a track,
wherein determining the at least one playback parameter comprises accessing metadata associated with at least one of the following:
   a song,
   a song part, and
   a track,
wherein the at least one playback parameter are established by at least one of the following:
   the metadata associated with at least one of the following:
      a song,
      a song part, and
      a track, and
   a user selectable control,
      wherein the user selectable control is configured to set the at least one playback parameter, and
      wherein the user selectable control is configured remotely, and
      wherein the selectable control is a foot-operable control,
wherein the at least one playback parameter comprises, but is not limited to, values associated with at least one of the following:
   a tempo,
   a level,
   a frequency modulation,
   an effect, and
   various other aspects; and
cause a playback in accordance to the playback parameter,
   wherein causing a playback comprises at least one of the following:
      outputting a signal comprised of at least one of the following:
         a song,
         a song part, and
         a track, and
      transmitting the signal to a remote location, and
   wherein the playback is quantized in accordance to at least one of the following:
      a tempo,
      a length,
      an internal clock, and
      an external device.

A Seventh Set of Embodiments for Modifying Playback Data Comprising at Least One of the Following Stages receive a modification to at least one playback parameter associated with at least one of the following:
   a song,
   a song part, and
   a track, and
   wherein receiving the modification comprises receiving the modification from a user selectable control,
      wherein the user selectable control is configured to modify the at least one playback parameter, and
      wherein the user selectable control is engaged remotely,
      wherein the selectable control is a foot-operable control, and
      wherein the modification is received during a playback, and wherein the at least one playback parameter comprises, but is not limited to, values associated with at least one of the following:
         a tempo,
         a level,
         a frequency modulation,
         an effect, and
         various other aspects;
cause a playback in accordance to the modified playback parameter,
   wherein causing a playback comprises at least one of the following:
      outputting a signal comprised of at least one of the following:
         a song,
         a song part, and
         a track, and
      transmitting the signal to a remote location.

wherein the playback is quantized in accordance to at
least one of the following:
a tempo,
a length, and
an external device.

An Eighth Set of Embodiments for Modifying Playback Tracks Comprising at Least One of the Following Stages access a plurality of tracks and data corresponding to each of the tracks;
  See the First Set of Embodiments for Accessing the Data
determine an arrangement for each track of the plurality of tracks in a song,
  See the Second Set of Embodiments for Arranging the Data arrange each track of the plurality of tracks in the song,
  wherein an arrangement of the song comprises at least one of the following:
    at least one song part comprised of a segment of parallel track tracks arranged for concurrent playback, and
    a series of song parts, wherein a first segment of parallel track tracks arranged in a first song part is configured for playback before a second segment of parallel tack tracks arranged in a subsequent song part,
receive a command to modify at least one playback parameter associated with a track layer,
  wherein the modification comprises adjusting a value of the at least one playback parameter,
  wherein the adjusted value of the playback parameter is configured to:
    turn off a playback of the track layer, and
    turn on playback of the track layer,
  wherein a user selectable control is configured to modify the at least one playback parameter, and
    wherein the user selectable control is engaged remotely,
    wherein the selectable control is a foot-operable control, and
    wherein the modification is received during a playback,
cause a playback in accordance to the modified playback parameter,
  wherein causing a playback comprises at least one of the following:
    outputting a signal comprised of at least one of the following:
      a song,
      a song part, and
      a track, and
    transmitting the signal to a remote location.
  wherein the playback is quantized in accordance to at least one of the following:
    a tempo,
    a length, and
    an external device.

E. Recording Module

A First Set of Embodiments for Recording a First Track Comprising at Least One of the Following Stages record the signal from the at least one input;
  wherein the recording is triggered by an engagement of a first selectable control;
  wherein the engagement of the first selectable control is operative to:
    activate a first state of operation, wherein the first state of operation is configured to trigger a recordation of the signal received from the at least one input,
    transition from the first state to a second state of operation when the engagement of the first selectable control exceeds a threshold period of time, wherein the second state of operation is configured to discard the signal recorded during the first state of operation;
    Alternative Language 1:
    wherein a recorded signal is retained when the first state of operation is maintained for a threshold period of time, and wherein the recorded signal is discarded when the first state of operation is not maintained for the threshold period of time;
    Alternative Language 2:
    wherein a recorded signal is retained when the second state of operation is not activated within a threshold period of time, and
    wherein the recorded signal is discarded when the second state of operation is activated within the threshold period of time;
convert the recorded signal to audio data within the at least one memory storage;
  wherein the audio data is associated with:
    an audio waveform configured for playback,
    a visual representation corresponding to the audio waveform configured for visual display, and at least one configuration parameter for the audio waveform,
  wherein the configuration parameter is structured to indicate an association of the audio track with at least one of the following:
    a song part,
    a track within the song part,
    a layer within a track,
    at least one playback parameter,
    at least one arrangement parameter, and
    at least one display parameter.

A Second Set of Embodiments for Recording a Subsequent Track Comprising at Least One of the Following Stages record the signal from the at least one input;
  wherein the recording is triggered by an engagement of a first selectable control;
wherein the engagement of the first selectable control triggers at least one of the following states:
  a first state configured to cause a recordation of track comprised of the signal received from the at least one input, wherein the recorded track is added to a track layer stack (e.g., a song part) within a designated grouping of parallel track layer stacks (e.g., song parts);
  a second state configured to cause a deletion of a track designated grouping of parallel track layer stack, and
wherein the first state is configured to transition to the second state when the engagement of the first selectable control exceeds a threshold period of time;

Alternative Language:
wherein a recorded signal is retained when the first state of the first selectable control is maintained for a threshold period of time, and
wherein the recorded signal is discarded if the first state of the first selectable control is not maintained for the threshold period of time;

A Third Set of Embodiments for Aligning the Recorded Signal for Playback Comprising at Least One of the Following Stages align each track within a parallel track layer stack arranged for concurrent playback,
wherein aligning the plurality of parallel track layers comprises:
inserting an audio marker into the recorded audio data associated with each track layer,
wherein the audio marker comprises an audio pulse followed by a dithered space of silence,
wherein the audio pulse is inserted into the beginning of a track associated with the audio data, and
wherein the audio pulse is inserted at the beginning of a PCM file comprising the audio data associated with the track and is used to align encoded or transported versions of the audio data.
This is for syncing purposes. PCM files by nature have a variable amount of dead space in the beginning which makes syncing them by aligning the beginnings of the files to each other impossible. This pulse, follow by a set amount of silence allows the alignment to happen because the amount of silence following the pulse is always the same.

A Fourth Set of Embodiments for Parallel Track Recording Comprising at Least One of the Following Stages record a first track in a parallel track layer stack;
See the First Set of Embodiments for Recording a First Track
receive an indication to record a subsequent track in the parallel track layer stack,
wherein the indication comprises at least one of the following:
a completion of a loop cycle associated with the parallel track layer stack,
wherein a duration of the loop cycle is determined by a configuration parameter associated with the parallel track layer stack;
wherein a quantity of loop cycles is determined by a configuration parameter associated with the parallel track layer stack;
wherein the completion of the loop cycle is configured to cause an input signal to be recorded and compiled as the subsequent track in the parallel track layer stack,
wherein the configuration is set in at least one configuration parameter associated with at least one of the following:
a track,
a song part, and
a song,
a user-selectable command triggering the recordation of the subsequent track in the parallel track layer stack,
wherein the user-selectable command comprises an overdub command,
wherein the overdub command is configured to cause an input signal to be recorded and compiled as the subsequent track in the parallel track layer stack, wherein the configuration of the overdub command is set in at least one configuration parameter associated with at least one of the following:
a track,
a song part, and
a song,
wherein the user-selectable command is triggered by a foot-operable control switch;
record an input signal received by the input module as a new track in the parallel track layer stack when the indication to record the subsequent track is received;
record an input signal received by the input module as an overlay mix to the first track when at least one of the following occurs:
the user-selectable command comprising the overdub command is not received, and
the completion of the loop cycle occurs.

A Fifth Set of Embodiments for Extending a Song Part or a Track Comprising at Least One of the Following Stages automatically extend the Initial Loop by recording a longer Secondary Loop on top of the Initial Loop,
whereas length of the Secondary Loop is any length greater than the Initial Loop and the Initial Loop is repeated, in whole or fractional increments, to match the length of the Secondary Loop
automatically extend the Initial Loop by recording a longer non-repeating overdub on top of the Initial Loop
whereas length of the non-repeating Overdub is any length greater than the Initial Loop and the Initial Loop is repeated, in whole or fractional increments, to match the length of the Overdub Section.
record an input signal received by the input module as a new track in a parallel track layer stack when the indication to record a new parallel track layer is received;
See the Fourth Set of Embodiments for Parallel Track Recording wherein the recordation is performed during a concurrent playback of the parallel track layers in the parallel track layer stack,
Wherein the concurrent playback of the parallel track layers in the parallel track layer stack is based on, at least in part, the playback data associated with each parallel track layers,
wherein concurrently playing the parallel tracks comprises looping the parallel track layer stack until a termination command is received;
if the length or the recorded new track is greater than the length of the parallel track layer stack, then:
extend each parallel track layer in the parallel track layer stack such that the length of each parallel track layer stack is congruent to the length of the recorded new track, wherein the extension to each parallel track layer is performed based on, at least in part, duplication of the audio data with a corresponding parallel track layer,
  wherein the duplication of the audio data are at least one of the following:
    whole track duplications, and
    fractional track duplications,
    wherein the fractional track duplications comprises a quantized fraction of the audio data associated with the parallel track layer,
  wherein the extension to each parallel track layer is performed based on, at least in part, a padding of the audio data with a corresponding parallel track layer.

A Sixth Set of Embodiments for Extending a Song Part or a Track Comprising at Least One of the Following Stages record an input signal received by the input module as a new track in a parallel track layer stack when the indication to record a new parallel track layer is received;
  See the Fourth Set of Embodiments for Parallel Track Recording wherein the recordation is performed during a concurrent playback of the parallel track layers in the parallel track layer stack,
    Wherein the concurrent playback of the parallel track layers in the parallel track layer stack is based on, at least in part, the playback data associated with each parallel track layers,
    wherein concurrently playing the parallel tracks comprises looping the parallel track layer stack until a termination command is received;
terminate the recordation of the new track in response to a termination command,
  wherein terminating the recordation of the new track comprises receiving a termination command,
    wherein the termination command is received during the concurrently playback of the parallel track layers,
    wherein the termination command is associated with a state of a control switch,
    wherein the termination command is received by an activation of a foot-operable switch,
    wherein the termination command is received by a remote activation of a control switch associated with the termination command,
    wherein the termination command is triggered upon an instruction to record a subsequent track in the parallel track layer stack,
    wherein the termination command is triggered upon an instruction to transition to a subsequent parallel track layer stack,
    wherein the termination command is triggered in response to a completion of loop cycles associated with the parallel track layer stack,
      wherein a quantity of loop cycles is determined by a configuration parameter associated with the parallel track layer stack;
if the length of the recorded new track is greater than the length of the parallel track layer stack, then:
  extend each parallel track layer in the parallel track layer stack such that the length of each parallel track layer stack is congruent to the length of the recorded new track,
    wherein the extension to each parallel track layer is performed based on, at least in part, duplication of the audio data with a corresponding parallel track layer,
      wherein the duplication of the audio data are at least one of the following:
        whole track duplications, and
        fractional track duplications,
        wherein the fractional track duplications comprises a quantized fraction of the audio data associated with the parallel track layer,
    wherein extending each parallel track layer in the parallel track comprises extending each parallel track layer in all concurrently played tracks for a song part in a group of networked devices.
    See Collaboration Module A Seventh Set of Embodiments for Extending a Song Part or a Track Comprising at Least One of the Following Stages record an input signal received by the input module as a new track in a parallel track layer stack when the indication to record a new parallel track layer is received;
  See the Fourth Set of Embodiments for Parallel Layer Recording
    wherein the recordation is performed during a concurrent playback of the parallel track layers in the parallel track layer stack,
      wherein the concurrent playback of the parallel track layers in the parallel track layer stack is based on, at least in part, the playback data associated with each parallel track layers,
      wherein concurrently playing the parallel tracks comprises looping the parallel track layer stack until a termination command is received;
if the length of the recorded new track is greater than the length of the parallel track layer stacks played back after a designed amount of loop cycles, then:
  add a loop cycle to the concurrent playback of the parallel track layers each time a delta in the length of the recorded new track exceeds the length of the parallel track layer stack,
    wherein adding a loop cycle to the concurrent playback of the parallel track layers comprises adding a loop cycle to all concurrently played tracks for a song part in a group of networked devices.
    See Collaboration Module An Eighth Set of Embodiments for Performance Mode Comprising at Least One of the Following Stages In some embodiments, performance capture mode allows the process of creation of individual loops and the non-looped performance (e.g. a guitar solo over a looped chord progression) to be captured as a single file so it can be shared for listener enjoyment or in order to collaborate with other musicians to add additional musical elements to the work. Time signature and tempo information is saved so that this file can be used in other Looper devices with the quantizing feature enabled. This information is saved dynamically so that if the tempo is changed during a performance, this information is captured as it happens and can adjust collaborating devices accordingly. A digital marker is used for various actions, such as changing a song part and the resulting performance file displays these changes visually so that collaborating musicians can see where these actions have taken place and can prepare themselves accordingly.

receive a performance mode indication,
        wherein the performance mode indication can be received at any time during or prior to a recordation of an input signal,
        wherein the performance mode indication is received by way of a user-selectable control engagement,
            wherein the performance mode indication is associated with a state of the user-selectable control,
        wherein the user-selectable control engagement is received by way of a foot-operable switch,
            wherein the performance mode indication is associated with a state of the foot-operable switch,
    record an input signal received by the input module,
        wherein the recorded signal is recorded as a track comprising configuration data,
            wherein a first portion of the configuration data correspond to those configuration data associated with other tracks in a parallel track layer stack,
                wherein the other tracks in the parallel track layer stack may be retrieved in accordance to a collaboration module operation,
            wherein a second portion of the configuration data correspond to a playback configuration parameter indicating that the track is not to be played concurrently with a parallel track layer stack upon a playback of the parallel track layer stack,
                wherein the playback configuration parameter is configured to be set for playback independently of the playback data associated with other parallel track layers in the parallel track layer stack,
        wherein the recordation is performed during a concurrent playback of the parallel track layers in the parallel track layer stack,
            wherein the concurrent playback of the parallel track layers in the parallel track layer stack is based on, at least in part, the playback data associated with each parallel track layers,
            wherein concurrently playing the parallel tracks comprises looping the parallel track layer stack until a termination command is received;
    if the length of the recorded new track is greater than the length of the parallel track layer stacks played back after a designed amount of loop cycles, then:
        add a loop cycle to the concurrent playback of the parallel track layers each time a delta in the length of the recorded new track exceeds the length of the parallel track layer stack,
            wherein adding a loop cycle to the concurrent playback of the parallel track layers comprises adding a loop cycle to all concurrently played tracks for a song part in a group of networked devices,
        See Collaboration Module
    if the parallel track layer stack transitions to a subsequent parallel track layer stack during the recordation,
        saving the transition data along with the recorded track,
            wherein the transition data is saved as metadata associated with the audio data corresponding to the recorded track,
            wherein the transition data is configured to provide an indication of a transition during a playback of the recorded track.

Additional Aspects:
1. A platform comprised of a plurality of methods for operating an apparatus as specified in various aspects of the description.
2. A platform of aspect 1, as further illustrated in the FIGURES.
3. An apparatus configured to perform a method of aspect 1, comprising a housing structured to accommodate a memory storage and a processing unit.
4. An apparatus configured to perform the method of aspect 1, comprising a housing structured to accommodate a memory storage, a processing unit, and a display unit.
5. The apparatus of any one of aspects 3 or 4, further comprising at least one control designed for foot-operable engagement.
6. The apparatus of any one of aspects 3-5, further comprising at least one of the following: at least one input port, an analog-to-digital convertor, a digital signal processor, a MIDI controller, a digital-to-analog convertor, and an output port.
7. The apparatus of any one of aspects 3-6, further comprising a communications module.
8. The apparatus of aspect 7, wherein the communications module is configured to engage in bi-directional data transmission in at least one of the following:
a wired communications medium, and
a wireless communications medium.
9. The apparatus of aspect 8, further comprising a remote computing device in operative communication with the apparatus.
10. The apparatus of aspect 9, wherein the remote computing device is configured for at least one of the following:
store data to and retrieve data from the memory storage of the apparatus, display visual representations corresponding to the data,
provide a user interface for interfacing with hardware and software components of the apparatus, and
cause an operation to be performed by the processing unit of the apparatus.
11. A system comprising a server in operative communication with at least one of the following:
the communications module in any of aspects 7-8, and
the remote computing device in any of aspects 9-10.
12. The system of aspect 11, wherein the server is configured to enable any one of the following:
storing data to and retrieving data from the memory storage of the apparatus,
displaying visual representations corresponding to the data,
providing a user interface for interfacing with hardware and software components of the apparatus, and
causing an operation to be performed by the processing unit of the apparatus.
13. A method to record audio and display the recorded and/or real-time audio data as audio waveforms on a self-enclosed, standalone recording device that resides on the floor and has an integrated display, or on a self-enclosed, standalone recording device that resides on the floor with a remote display, such that the unit can capture and loop audio via hands-free or hands-on operation.
14. A method to record audio and display the recorded and/or real-time audio data as visual segments on a self-enclosed, standalone recording device that resides on the floor and has an integrated display, or on a self-enclosed, standalone recording device that resides on the floor with a remote display, such that the unit can capture and loop audio via hands-free or hands-on operation.

15. A method to record audio and display the recorded and/or real-time audio data as visual segments on a system that includes a display where part of the system resides on the floor and part of the system does not reside on the floor such that the system can capture and loop audio via hands-free or hands-on operation.

16. A method that uses a self-enclosed, standalone unit to record, capture or import an Initial Loop and offers the ability to automatically extend the Initial Loop by recording a longer Secondary Loop on top of the Initial Loop, whereas length of the Secondary Loop is any length greater than the Initial Loop and the Initial Loop is repeated, in whole or fractional increments, to match the length of the Secondary Loop.

17. A method that uses a self-enclosed, standalone unit to record, capture or import an Initial Loop and then automatically extend the Initial Loop by recording a longer non-repeating overdub on top of the Initial Loop, whereas length of the non-repeating Overdub is any length greater than the Initial Loop and the Initial Loop is repeated, in whole or fractional increments, to match the length of the Overdub Section.

18. A method that uses on a self-enclosed, standalone device that resides on the floor and has an integrated display, or on a self-enclosed, standalone device that resides on the floor with a remote display to create and capture a new Song Part, whereas the device's volatile and/or non-volatile memory is the only limitation for the number of Song Parts that can be added.

19. A method that uses a self-enclosed, standalone recording device that resides on the floor and has an integrated display, or on a self-enclosed, standalone recording device that resides on the floor with a remote display, to create and capture a new parallel Loop, whereas the device's volatile and/or non-volatile memory is the only limitation for the number of Loops that can be added.

20. A method that uses on a self-enclosed, standalone recording device that resides on the floor and has an integrated display, or on a self-enclosed, standalone recording device that resides on the floor with a remote display to store individual overdub tracks and a mixed version of the overdubs such that a new version of the mixed overdubs can be created using an individual overdub tracks with an integrated display, remote display and/or mobile application.

21. A method that inserts an audio marker, such as an audio pulse followed by a dithered space of silence, at the beginning of PCM files and uses this audio marker to align encoded or transported versions of the files.

22. A method that uses a self-enclosed, standalone recording device that resides on the floor and has an integrated display, or a self-enclosed, standalone recording device that resides on the floor with a remote display, that is connected to a local server or remote server to record, capture, create or import files and send files directly to other self-enclosed, standalone units via a Local Area Network or Wide Area Network connection.

23. A method that initiates audio capture at the active state transition of a button, and subsequently confirms and retains the audio capture if the active state is released within a programmed Release Period. Conversely the audio captured during the initial active state of the button will be discarded if the initial active state of the button is not released within the programmed Release Period.

24. A method that uses a self-enclosed, standalone recording device that resides on the floor and has an integrated display, or on a self-enclosed, standalone recording device that resides on the floor with a remote display to capture an audio file and allow the user to increase and decrease the playback speed of the audio file, maintaining the original pitch, live or semi-live while performing with the audio file.

25. A method that uses a self-enclosed, standalone recording device that resides on the floor and has an integrated display, or on a self-enclosed, standalone recording device that resides on the floor with a remote display to capture an audio file and allow the unit to increase and decrease the playback speed of the audio file, maintaining the original pitch, to quantize the recording length to the timing of the song.

26. A method that converts visual waveform to a gradient-form, where the relative or absolute magnitude of the waveform is converted to density of color that is represented by gradients of the color, or colors.

27. A method that uses a self-enclosed, standalone unit to record, capture or import a Loop, and then detect none-zero crossings of the audio waveform at the beginning and end of the Loop, and then automatically apply audio fade in at the beginning of the Loop and/or audio fade out at the end of the loop.

The following is claimed:

1. A method comprising:
arranging audio data into the following structure:
  a song comprised of at least one song part,
  at least one track within the at least one song part, and
  at least one layer within the at least one track;
enabling a playback of the arranged audio data;
recording subsequent audio data during the playback of the arranged audio data, wherein recording the subsequent audio data comprises the following:
  recording the subsequent audio data in performance capture mode, and
  controlling the playback of the arranged audio data during the recording of the subsequent audio data in the performance capture mode, wherein controlling playback comprises the following:
    queuing a subsequent song part, and
    transitioning from a selected song part to the queued subsequent song part; and
rendering a performance mode track, wherein rendering the performance mode track comprises at least one of the following:
  rendering the recorded subsequent audio data along with the controlled playback of the arranged audio data as the performance mode track, and
  rendering the recorded subsequent audio data as the performance mode track separately from the arranged audio data.

2. The method of claim 1, further comprising:
capturing metadata corresponding to operations made during the controlled playback of the arranged audio data; and
packaging the performance mode track of the subsequent audio data with:
  each track of each song part in the arranged audio data, and
  the metadata.

3. The method of claim 1, further comprising:
overdubbing a selected layer within a selected track, wherein overdubbing the selected layer comprises at least one of the following:
  extending the selected layer,
  extending the selected track associated with the selected layer, and extending the selected song part comprising the selected track associated with the selected layer.

4. The method of claim 3, wherein the selected track is extended by at least one of the following:
   a duration of the selected layer, and
   a quantized increment of the selected layer relative to the selected song part comprising the selected track associated with the selected layer;
   wherein layers in the selected track are extended to the same duration as the selected layer.

5. The method of claim 1, further comprising receiving the audio data prior to arranging the audio data.

6. The method of claim 5, wherein receiving the audio data comprises recording an audio signal from at least one of the following:
   a wired signal,
   a wireless signal,
   an analog signal, and
   digital signal.

7. The method of claim 5, wherein receiving the audio data comprises downloading, from a centralized server shared by a plurality of networked looping devices, at least one of the following:
   the at least one layer,
   the at least one track,
   the at least one song part, and
   the at least one song.

8. The method of claim 1, further comprising capturing video data associated with the audio data.

9. The method of claim 8, wherein capturing the video data comprises capturing a video segment by a first device in parallel with recording an audio signal by a second device.

10. The method of claim 9, wherein capturing the video data comprises capturing the video data on the first device in response to a trigger initiated on the second device.

11. The method of claim 10, wherein capturing the video data in response to the trigger initiated on the second device comprises receiving a command to record the audio signal at the second device.

12. The method of claim 8, wherein arranging the audio data comprises associating the recorded audio data with a session track.

13. The method of claim 12, further comprising associating a captured video segment with the session track.

14. The method of claim 13, wherein the captured video segment comprises a performance video segment associated with the performance mode track.

15. The method of claim 13, wherein enabling the playback of the arranged audio data comprises playing back a captured video segment corresponding to each track within the song.

16. The method of claim 15, further comprising displaying each captured video segment concurrently with the playback of each corresponding track within the song, wherein displaying each captured video segment comprises looping each video segment when each corresponding track is looped.

17. The method of claim 16, wherein controlling the playback of the arranged audio data effects a playback of the video data associated with the arranged audio data, wherein the corresponding playback of the video data associated with the arranged audio data comprises:
   displaying each captured video segment corresponding to each track currently playing, and
   hiding each captured video segment corresponding to each track not currently playing.

18. The method of claim 17, wherein rendering the performance mode track further comprises rendering the video data associated with the audio data into a composite multimedia file.

19. The method of claim 17, wherein rendering the video data comprises rendering each captured video segment in accordance to the controlled playback of the arranged audio data.

20. The method of claim 18, further comprising publishing at least one of the following:
   the at least one layer,
   the at least one track,
   the at least one song part,
   the at least on song,
   the performance mode track, and
   the composite multimedia file.

* * * * *